(12) United States Patent
Terpstra

(10) Patent No.: US 10,641,145 B2
(45) Date of Patent: May 5, 2020

(54) EXTRACTION APPARATUS

(71) Applicant: Envirochasing IP Holdings Pty Ltd, Stirling, Western Australia (AU)

(72) Inventor: Steven Terpstra, Cardup (AU)

(73) Assignee: ENVIROCHASING IP HOLDINGS PTY LTD, Stirling, WA (AU)

( * ) Notice: Subject to any disclaimer, the term of this patent is extended or adjusted under 35 U.S.C. 154(b) by 0 days.

(21) Appl. No.: 15/528,032

(22) PCT Filed: Nov. 18, 2015

(86) PCT No.: PCT/AU2015/000699
§ 371 (c)(1),
(2) Date: May 18, 2017

(87) PCT Pub. No.: WO2016/077868
PCT Pub. Date: May 26, 2016

(65) Prior Publication Data
US 2018/0334938 A1    Nov. 22, 2018

(30) Foreign Application Priority Data

Nov. 19, 2014 (AU) ................................ 2014904657
Mar. 17, 2015 (AU) ................................ 2015900960

(51) Int. Cl.
*F01N 3/05* (2006.01)
*F01N 3/04* (2006.01)
(Continued)

(52) U.S. Cl.
CPC ............. *F01N 3/05* (2013.01); *F01N 3/0205* (2013.01); *F01N 3/04* (2013.01); *F01N 3/30* (2013.01);
(Continued)

(58) Field of Classification Search
CPC ........ F01N 13/14; F01N 2240/10; F01N 5/02; F02N 19/10; B60H 1/00492; B60H 1/025; B60H 1/20
(Continued)

(56) References Cited

U.S. PATENT DOCUMENTS 5,740,670 A    4/1998  Woods
6,048,906 A    4/2000  Ernst et al.
(Continued)

FOREIGN PATENT DOCUMENTS

EP    2711516 A2    3/2014
GB    2279271 A     1/1995
(Continued)

OTHER PUBLICATIONS

International Search Report dated Mar. 10, 2016 from International Application No. PCT/AU2015/000699, 5 pages.
(Continued)

*Primary Examiner* — Phutthiwat Wongwian
*Assistant Examiner* — Diem T Tran
(74) *Attorney, Agent, or Firm* — MH2 Technology Law Group, LLP

(57) ABSTRACT

An extraction apparatus (10) adapted to capture exhaust gas emitted by an internal combustion engine and to dilute the exhaust gas by mixing with air and also cool the exhaust gas. The extraction apparatus (10) has a first flow path (31), second flow path (32), and third flow path (33). The first flow path (31) extends between inlet (35) and an outlet (37) for air flow from the inlet to the outlet. The second flow path (32) receives exhaust gas emitted from the engine and delivers it into the first flow path (31) for mixing with an air flow along the first flow path. The third flow path (33) delivers water for mixing with the air flow. The arrangement is such that there is confluence of air, exhaust gas and water
(Continued)

to provide a fluid mixture for discharging through the outlet (37). The exhaust gas is cooled using the cooling effects of the air and also the cooling effects of water in heat exchange relation with the exhaust gas prior to mixing of the exhaust gas with the air. There is also cooling of the mixture of exhaust gas and air using the cooling effects of water in heat exchange relation with the mixture, and also cooling by injection of water into the air. The various flow paths are configured for the requisite heat exchange relation.

20 Claims, 11 Drawing Sheets

(51) Int. Cl.
    *F01N 3/34*     (2006.01)
    *F01N 3/30*     (2006.01)
    *F01N 3/02*     (2006.01)
    *F01N 13/00*     (2010.01)

(52) U.S. Cl.
    CPC ............. *F01N 3/34* (2013.01); *F01N 13/002* (2013.01); *F01N 2240/02* (2013.01); *F01N 2590/06* (2013.01); *F01N 2610/00* (2013.01); *Y02T 10/20* (2013.01)

(58) Field of Classification Search
    USPC .................................................. 60/298, 320
    See application file for complete search history.

(56) References Cited

U.S. PATENT DOCUMENTS

| | | | |
|---|---|---|---|
| 7,552,722 | B1 | 6/2009 | Shieh et al. |
| 2005/0034715 | A1 | 2/2005 | Terpstra |
| 2006/0080964 | A1* | 4/2006 | Youssef ............... F22B 1/1838 60/772 |
| 2006/0124116 | A1 | 6/2006 | Bui |
| 2011/0265451 | A1 | 11/2011 | Gehret et al. |

FOREIGN PATENT DOCUMENTS

| | | |
|---|---|---|
| GB | 2373197 A | 9/2002 |
| WO | 0204099 A1 | 1/2002 |
| WO | 2005040568 A1 | 5/2005 |

OTHER PUBLICATIONS

Extended European Search Report dated Apr. 30, 2018 from European Application No. 15860481.9, 7 pages.

\* cited by examiner

EXTRACTION APPARATUS

CROSS REFERENCE TO RELATED APPLICATIONS

This application is U.S. National Stage Application of PCT/AU2015/000699 filed 18 Nov. 2015, which claims priority to Australia Application No. 2014904657 filed 19 Nov. 2014, and Australia Application No. 2015900960 filed 17 Mar. 2015, the contents of all of which are hereby incorporated by reference in their entirety.

TECHNICAL FIELD

This invention relates to systems and methods of extraction of exhaust gases.

The invention concerns an extraction apparatus, a machine incorporating such an apparatus, and also a method of extracting exhaust gases.

This invention also concerns systems and methods of treatment of exhaust gases.

The extraction apparatus according to the invention has been devised particularly, although not necessarily solely, for use with machines having an internal combustion engines discharging hot exhaust gases during operation thereof; for example, machines used to perform cutting and chasing operations on brick work and masonry. The extraction apparatus may, however, also be used to extract exhaust gases from other machinery powered by internal combustion engines, such as chain saws and lawn mowers.

Through use of the invention, exhaust gases generated by machinery in a working environment where accumulation of exhaust gases could possibly create hazardous working conditions may be captured prior to emission into the working environment, and treated by dilution and also by being cooled somewhat prior to being conveyed to a remote location away from the working environment.

BACKGROUND ART

The following discussion of the background art is intended to facilitate an understanding of the present invention only. The discussion is not an acknowledgement or admission that any of the material referred to is or was part of the common general knowledge as at the priority date of the application.

It is often necessary to use equipment powered by internal combustion engines within confined environments such as internally within buildings, trenches and other closed working environments. In such circumstances, exhaust gases from the internal combustion engines are discharged into the closed environment and can accumulate to an extent where the exhaust gases often create hazardous working conditions. It is therefore desirable to remove the exhaust gases from the closed environment.

There have been several proposals for removal of exhaust gases emitted from internal combustion engines operating within closed environments. One such proposal is disclosed in AU2004284110 which is directed to an extraction apparatus operable to capture exhaust gas emitted from the internal combustion engine and mix the exhaust gas with air to both dilute the exhaust gas and to also have a cooling effect on the exhaust gas. Water is also injected into the incoming air to have a further cooling effect on the exhaust gas. The resultant mixture of exhaust gas, incoming air and injected water is then extracted, typically by way of a suction line, and conveyed to a remote location away from the closed environment.

While the arrangement disclosed in AU2004284110 has proved to be a commercial success, certain improvements can be contemplated.

In the arrangement disclosed in AU2004284110, there is provided an axial flow passage defining an air flow path from an air inlet to an outlet which is connected to the suction line. The exhaust gas from the engine is delivered into the flow path for mixing with the air flow by way of an exhaust gas inlet having a tubular discharge section opening onto the flow path. The discharge section is centrally located within the flow passage and extends along the flow passage towards the outlet. The centrally located discharge section can constitute an impediment to flow along the flow path and so restrict the volume of exhaust gas that is capable of being handled. The restriction can possibly also adversely affect engine performance, as it can create a lower pressure zone at the location at which the centrally located discharge section opens onto the flow path. The lower pressure zone can lead to creation of a negative pressure at the engine exhaust, thereby adversely affecting engine performance. This provides an area where improvement may be contemplated.

In certain instances, it is possible that there might not be adequate mixing between the exhaust gas and the air. In particular, there might, for example, be inadequate mixing between the exhaust gas and the air, as well as any water injected into the fluid flow, within the extraction apparatus prior to the fluid flow discharging from the outlet to which the suction line is connected. This inadequate mixing may result in the formation of hot spots in the suction line, particularly in the region immediately downstream of the extraction apparatus, leaving the suction line vulnerable to heat damage, perhaps even to the extent of melting in parts. This provides an area where improvement may be contemplated.

Further, while the arrangement disclosed in AU2004284110 provides some cooling of the exhaust gas, an improvement to the extent of available cooling may also be contemplated.

Still further, while the arrangement disclosed in AU2004284110 may afford some cooling of the exterior part of the extraction apparatus exposed to contact with a user while the extraction apparatus is in operation, an improvement to the extent of available cooling may also be contemplated.

It is against this background, and the problems and difficulties associated therewith, that the present invention has been developed. The present invention need not necessarily address any or all of these areas where improvement has been contemplated; rather, development of the invention has been motivated by recognition of these areas for potential improvement.

At the very least, the present invention provides a useful choice to that available by way of the arrangement disclosed in AU2004284110.

SUMMARY OF INVENTION

Broadly, there is disclosed a system for, and method of, capturing an exhaust gas and mixing air with the exhaust gas for diluting the exhaust gas and for cooling the exhaust gas. The cooling may be provided by the cooling effects of the air, and optionally the cooling effects of water in heat exchange relation with the exhaust gas prior to mixing thereof with the air, as well as the cooling of the mixture of exhaust gas and air using the cooling effects of water in heat exchange relation with the mixture, and the cooling effects of injection of water into the air. The injection of water may assist further cooling of the mixture and may also serve to dissolve a portion of the exhaust gases.

With this arrangement, exhaust gas can be extracted from a working environment at which it is generated, with the exhaust gas being diluted and cooled to facilitate the extraction. Typically, the diluted exhaust gas is conveyed along a discharge line such as an extraction hose, in which case it is desirable that the exhaust gas be cooled to an extent such that the discharge line can be handled safely by a user and also that the exhaust gas does not cause heat damage to the discharge line. In one arrangement, the extraction hose may comprise a suction hose connected to a suction source. In another arrangement, the extraction hose may be operable in conjunction with an air pressure source, such as a flow generator in the form of a blower, to generate an air flow within the system for conveying the mixture along the extraction hose.

According to a first aspect of the invention there is provided an extraction apparatus comprising a body defining a first flow path extending between an inlet and an outlet for air flow from the inlet to the outlet, a second flow path for receiving an exhaust gas flow, the second flow path communicating with the first flow path to deliver exhaust gas into the first flow path for mixing with the air flow, a third flow path for delivery of water for mixing with the air flow whereby there is confluence of air, exhaust gas and water to provide a fluid mixture for discharging through the outlet, the third flow path being in heat exchange relation with the first flow path whereby water flow in the third flow path provides a cooling effect on the fluid mixture, the third flow path further being in heat exchange relation with the second flow path whereby water flow in the third flow path provides a cooling effect on exhaust gas flow along the second flow path; the first flow path being in heat exchange relation with the second flow path whereby flow along the first flow path provides a cooling effect on exhaust gas flow along the second flow path, and wherein the body comprises an exterior wall defining a boundary of the third flow path, a first interior wall disposed inwardly of the exterior wall, at least a portion of the third flow path being defined between the exterior wall and the first interior wall, and a second interior wall, at least a portion of the second flow path being defined between at least a portion of the first interior wall and the second interior wall whereby the second interior wall provides a dividing wall between the first flow path and the second flow path.

There is confluence of air, exhaust gas and water in the sense that they merge together to provide the fluid mixture. However, the air, exhaust gas and water do not necessarily merge together at a common junction; that is, there may, for example, be injection of water into the air flow prior to delivery of the exhaust gas into the air flow for mixing therewith, which is the case with certain embodiments.

The body may comprise first, second and third cooling surfaces, the first cooling surface being defined by the first interior wall for exposure to hot exhaust gas flowing along the second flow path, the first cooling surface being cooled by the cooling effect of water flow through the third flow path, hot exhaust gas flowing along the second flow path being exposed to the first cooling surface whereby the first cooling surface can absorb heat from the hot exhaust gas, the second surface being defined by the second interior wall for exposure to hot exhaust gas flowing along the second flow path, the second cooling surface being cooled by the cooling effect of a flow along the first flow path, hot exhaust gas flowing along the second flow path being exposed to the second cooling surface whereby the second cooling surface can absorb heat from the hot exhaust gas, and the third cooling surface being defined by the first interior wall for exposure to the fluid mixture of exhaust gas, air and injected water flowing along the first flow path, the third cooling surface being cooled by the cooling effect of water flow through the third flow path whereby the third cooling surface can absorb heat from the fluid mixture prior to the fluid mixture exiting through the outlet.

The delivery of water into the first flow path may involve delivery of water into the air flow along the first flow path prior to, during, or both prior to and during, movement of the air flow along the first flow path. In one arrangement, the third flow path may be arranged to deliver water into an air stream upon or after entry of the air stream through the inlet; that is, at the inlet or downstream of the inlet. In another arrangement, the outlet may be arranged to deliver water into an air stream prior to entry of the air stream through the inlet; that is, upstream of the inlet.

The third flow path may incorporate provision for said delivery of water by injection into the first flow path to provide a mixture of air and water. The water may be injected as a spray.

Such provision may comprise a water delivery outlet configured as an injection means.

The injection means may be so positioned relative to the second cooling surface that the second cooling surface is cooled by the cooling effect of flow of the mixture of air and water along the first flow path.

The injection means may be configured as one or more delivery jets for injecting water under pressure into the air stream.

The delivery jet(s) may be of any appropriate type. In one arrangement, there may be a single delivery jet configured as an annular jet disposed circumferentially about the first flow path. In another arrangement, the delivery jets may comprise a plurality of jets disposed, for example, at intervals circumferentially about the first flow path.

The injection means may be arranged to delivery water into the first flow path with a directional component in the direction of flow within the first flow path from the inlet to the outlet.

The third flow path may incorporate provision for delivery of water into the exhaust gas.

The provision for delivery of water into the exhaust gas may be arranged to deliver water into the exhaust gas prior to, during, or both prior to and during, delivery of the exhaust gas into the first flow path. This may be an alternative to, or an addition to, delivery water into the air flow along the first flow path. In other words, water delivered into the exhaust gas may also constitute the water delivered for mixing with the air to provide the fluid mixture.

The third flow path may incorporate a further water delivery outlet for delivery of water into the exhaust gas flow.

The further water delivery outlet may be arranged to deliver water into the exhaust gas flow at a zone adjacent the delivery port at which exhaust gas is delivered into the air flow adjacent the delivery zone The second flow path may open onto the first flow path at a delivery outlet. In particular, the second flow path may open onto the first flow path at a delivery outlet adjacent a side wall portion bounding the first flow path. With this arrangement, the exhaust gas is introduced into the first flow path at the periphery (side boundary) of the air flow, avoiding the need for a delivery structure disposed within a central region of the first flow path and the resultant flow impediment or restriction to flow that it would necessarily provide.

The body may further comprise a fourth cooling surface, the fourth cooling surface being disposed adjacent the delivery port for exposure to exhaust gas flowing to and through the delivery outlet.

The fourth cooling surface may be defined by the first interior wall.

The first interior wall may comprise a first end section disposed adjacent the inlet, a second end section disposed adjacent the outlet, and an intermediate section between the first and second end sections, wherein the first end section defines the first cooling surface, and the second end section defines the third cooling surface.

The intermediate section may define the fourth cooling surface.

The first end section and the second end section may be offset with respect to each other, and the intermediate section may provide a transition between the two offset end sections, the offsetting arrangement providing space within the body to accommodate the second interior wall.

The second interior wall may be disposed inwardly of the first interior wall.

The first flow path may be bounded by the first and second interior walls which cooperate to define said side wall portion bounding the first flow path.

The delivery outlet may comprise one or more delivery ports.

In one arrangement, the second flow path may open onto the first flow path circumferentially around the boundary of the first flow. With this arrangement, the delivery port may be configured as an annular delivery port extending circumferentially around the first flow path.

More particularly, the second flow path may open onto the first flow path circumferentially around the boundary of the first flow path by way of a continuous opening providing the annular delivery port. With this arrangement, the delivery zone may comprise an annular zone extending around the air flow along the first flow path.

The annular delivery port may be defined between the first and second interior wall sections bounding the first flow path, wherein the first interior wall section defines that portion of the first flow path downstream of the annular delivery port and the second interior wall section defines that portion of the first flow path upstream of the annular delivery port.

The annular delivery port may comprise an angularly disposed surface for directing exhaust gas entering the first flow path at the delivery zone angularly in a direction towards the outlet of the first flow path.

In another arrangement, the delivery outlet may comprise one or more delivery ports provided in the side wall portion. More particularly, the delivery outlet may comprise a plurality of delivery ports provided in the side wall portion. The delivery ports may be disposed at spaced intervals in an array extending circumferentially around and along the side wall portion. With this arrangement, the exhaust gas is still introduced into the first flow path at the periphery (side boundary) of the air flow along the first flow path but at locations around and along the side wall portion.

Preferably, the respective section of the first flow path defined by the first interior wall is downstream of the respective section of the first flow path defined by the second interior wall with respect to the direction of flow along the first flow path, and the minimum cross-sectional flow area of that section of the first flow path defined by the first interior wall is equal to or greater than the minimum cross-sectional flow area of that section of the first flow path defined by the second interior wall.

The minimum cross-sectional flow area of that section of the first flow path defined by the first interior wall is preferably adjacent the delivery port.

Similarly, the minimum cross-sectional flow area of that section of the first flow path defined by the second interior wall also adjacent the delivery port. More particularly, it is desirable for the minimum cross-sectional flow area of that section of the first flow path defined by the second interior wall to be at the corresponding end of the second interior wall.

It is believed that the arrangement in which the minimum cross-sectional flow area of that section of the first flow path defined by the first interior wall is equal to or greater than the minimum cross-sectional flow area of that section of the first flow path defined by the second interior wall may assist in entry of the exhaust gas flow into the first flow path from the second flow path.

It is also believed that the arrangement in which the minimum cross-sectional flow area of that section of the first flow path defined by the first interior wall is equal to or greater than the minimum cross-sectional flow area of that section of the first flow path defined by the second interior wall may assist in avoiding development of a negative pressure in the second flow path upstream of the delivery port. This is believed likely to be advantageous, as negative pressure at the exhaust of an engine on which the extraction apparatus is installed is believed likely to affect engine performance.

The water may assist in cooling the fluid mixture comprising the exhaust gas.

The water may also serve to dissolve a portion of the exhaust gas.

The water may also assist in cooling the exterior of the body, or at least part that part of exterior of the body likely to come into contact with a user while the extraction apparatus is in operation.

The exhaust gas is cooled prior to delivery into the air flow. The exhaust gas is also cooled by passing cooling water in heat exchange relation with the exhaust gas and also passing a cooling air flow in heat exchange relation with the exhaust gas.

More particularly, the third flow path is in heat exchange relation the second flow path, whereby water flow in the third flow path provides a cooling effect on exhaust gas flow along the second flow path, and the first flow path is in heat exchange relation with the second flow path, whereby flow along the first flow path provides a cooling effect on exhaust gas flow along the second flow path.

Further, the third flow path is in heat exchange relation with the first flow path whereby water flow in the third flow path provides a cooling effect on the fluid mixture. More particularly, the third flow path may be in heat exchange relation with the first interior wall defining that portion of the first flow path downstream of the annular delivery port.

The second flow path may be disposed about the first flow path.

The third flow path for delivery of water for mixing with the air flow may be disposed about the first and second flow paths.

More particularly, the third flow path may be disposed directly about the second flow path and also directly about that portion of the first flow path extending between the delivery zone and the outlet. Further, the third flow path may be disposed indirectly about that portion of the first flow path about which the second flow path is disposed, the relationship being indirect because of the intervening the second flow path. In this way, that portion of the first flow path downstream of the delivery zone is surrounded by a portion of the third flow path, and that portion of the first flow path upstream of the delivery zone is surrounded by the second flow path which in turn is surrounded by a further portion of the third flow path.

With this arrangement, water flow along the third flow path is in heat exchange relationship with that portion of the first flow path downstream of the delivery zone and also the second flow path thereby having a cooling effect thereon.

Further, air flow along the first flow path is in heat exchange relationship with that portion of the first flow path upstream of the delivery zone, thereby having a cooling effect thereon and consequently a cooling effect on exhaust gas flow along the second flow path.

The exterior wall of the body may be disposed directly about the third flow path. With this arrangement, water flow along the third flow path is in heat exchange relationship with exterior wall, thereby providing a cooling effect on the exterior wall. In this way, the water may also assist in cooling the exterior of the body, or at least part that part of exterior of the body likely to come into contact with a user while the extraction apparatus is in operation, as referred to above.

The delivery outlet may be configured to establish a low pressure region within the first flow path at or adjacent the delivery zone. The establishment of such a low pressure region may be advantageous. The establishment of such a low pressure region may, for example, assist in promoting flow from the inlet of the first flow path; that is, the presence of the low pressure region may assist in ambient air being drawn into the inlet from atmosphere.

The configuration of the delivery outlet to establish a low pressure region within the of the first flow path at or adjacent the delivery zone may involve the abovementioned arrangement configured to direct exhaust gas entering the first flow path at the delivery zone angularly in a direction towards the outlet of the first flow path.

The water flow along the third flow path may not only provide water for mixing with the air flow, but may also provide water for cooling purposes.

For this purpose, the quantity of water provided to the third flow path may exceed requirements for mixing with the air flow, with surplus water being discharged the third flow path to carrying away heat.

Accordingly, the third flow path may be provided with an inlet and a discharge outlet for water flow between the inlet and discharge outlet, whereby surplus water can be discharged through the discharge outlet.

The inlet for the third flow path may comprise one or more inlet portions, each adapted to receive a supply of water. The inlet portions may each be configured as a coupling such as nozzle fitting to which a water supply line can be connected. The provision of a plurality of inlet portions may be advantageous in ensuring an adequate supply of water under pressure to the third flow path to satisfy water demand for both supply to the delivery outlet and for cooling purposes.

The inlet and the discharge outlet for the third flow path may be disposed at or adjacent opposed ends of the body, whereby the third flow path extends at least substantially along the length of the body between the opposed ends.

The body may comprise an external wall disposed between the opposed ends, the external wall comprising the exterior wall defining a boundary of the third path. With this arrangement, water flow along the flow path can have a cooling effect on the external wall.

As mentioned above, the configuration of the delivery port to establish a low pressure region within the of the first flow path at or adjacent the delivery zone may involve an arrangement to direct exhaust gas entering the first flow path at the delivery zone angularly in a direction towards the outlet of the first flow path. The angularly disposed intermediate section of the first interior wall may be influential in the arrangement to direct exhaust gas entering the first flow path at the delivery zone angularly in a direction towards the outlet of the first flow path. The adjacent end of the second interior wall may also be configured to promote flow of exhaust gas entering the first flow path at the delivery zone angularly in a direction towards the outlet of the first flow path. By way of example, the adjacent end of the second interior wall may be chamfered.

The delivery velocity at which exhaust gas enters the first flow path at the delivery zone may also contribute to the establishment of the low pressure region.

The second flow path may have an exhaust inlet provided on the exterior wall.

The inlet of the first flow path may be open to atmosphere to receive ambient air, either directly or via a delivery system such as a blower.

The inlet may be configured as a convergent nozzle.

In the arrangement in which the inlet is configured as a convergent nozzle, the delivery outlet of the third flow path may be adapted to deliver of water into a low pressure zone generated in the air flow along the first flow path downstream of the convergent nozzle. This may provide a venturi effect for assisting in the delivery of water into, and mixing of the water with, the air flow along the first flow path.

The first flow path may be adapted for connection to a flow generator to creating an air flow along the first flow path from the inlet to the outlet. The flow generator may take any appropriate form. By way of example, in one arrangement, the flow generator may comprise suction source for extracting the fluid mixture received from the outlet, thereby causing air to be drawn into the inlet. In another arrangement, the flow generator may comprise a blower for blowing air into the inlet, thereby causing an air flow along the first flow path to the outlet.

There may be means associated with the first flow path for causing disruption in the air flow. The disruption may, for example, comprise a turbulence generated in the air flow. The disruption may assist in promoting mixing of the exhaust gas with the air flow to assist in dilution of the exhaust gas. Further, the disruption may assist in promoting thermal effects of the air flow; that is, promoting the cooling influence of the air flow. Still further, the disruption may assist in promoting dissolution of exhaust gas in water delivered into the air flow. Furthermore, the disruption may assist generally in achieving effective mixing between the air, exhaust gas and injected water, with the aim of avoiding development of hot spots in the discharge line.

The means for causing disruption in the flow may take any appropriate form, including for example a formation provided at the boundary of the flow path downstream of the delivery zone at which exhaust gas in delivered into the flow.

There may be means associated with the first flow path for influencing the flow pattern of air flowing along the first flow path upstream of the delivery zone at which exhaust gas in delivered into the flow. The means may be configured to generate a swirling or similar circulatory effect in flow along the flow path. The effect may assist in promoting mixing of water delivered into the first flow path with air flow therealong. Further, the effect may assist in promoting thermal effects of the air flow and resultant fluid mixture of air and water; that is, the cooling influence of the flow. Still further, the effect may assist generally in achieving effective mixing between the air, exhaust gas and injected water, with the aim of avoiding development of hot spots in the discharge line.

The means for generation of a swirling or similar effect in flow along the flow path. Such means may be disposed at or adjacent the inlet of the first flow path. Further such means may take any appropriate form, including for example a vane assembly over which the flow can pass.

The vane assembly may also have provision for delivery of water into the air flow.

According to a second aspect of the invention there is provided an extraction apparatus comprising a body defining a first flow path extending between an inlet and an outlet for air flow from the inlet to the outlet, a second flow path for receiving an exhaust gas flow, the second flow path communicating with the first flow path to deliver exhaust gas into the first flow path for mixing with the air flow to provide a fluid mixture, and a third flow path for water, the third flow path being in heat exchange relation with the first flow path whereby water flow in the third flow path provides a cooling effect on the fluid mixture, the third flow path further being in heat exchange relation with the second flow path whereby water flow in the third flow path provides a cooling effect on exhaust gas flow along the second flow path, and the first flow path being in heat exchange relation with the second flow path whereby flow along the first flow path provides a cooling effect on exhaust gas flow along the second flow path.

According to a third aspect of the invention there is provided an extraction apparatus comprising a body defining a first flow path extending between an inlet and an outlet for air flow from the inlet to the outlet, a second flow path for receiving an exhaust gas flow, the second flow path communicating with the first flow path to deliver exhaust gas into the first flow path for mixing with the air flow at a delivery zone, the first flow path being bounded by a side wall portion and the second flow path opening onto the first flow path adjacent side wall portion at a delivery outlet, the delivery outlet being configured to direct exhaust gas entering the first flow path at the delivery zone angularly in a direction towards the outlet of the first flow path.

With respect to the third aspect of the invention, the delivery outlet may comprise a delivery port is configured as an annular delivery port extending circumferentially around the first flow path.

The annular delivery port may comprise an angularly disposed wall surface for directing exhaust gas entering the first flow path at the delivery zone angularly in a direction towards the outlet of the first flow path.

The extraction apparatus according to the third aspect of the invention may further comprises a third flow path for delivery of water for mixing with the air flow, whereby there is confluence of air, exhaust gas and water to provide a fluid mixture discharging through the outlet.

The second and third aspects of the invention may, as appropriate, have any one of more of the features referred to above in relation to the first aspect of the invention.

According to a fourth aspect of the invention there is provided a method of extracting an exhaust gas using apparatus according to the first, second or third aspect of the invention.

According to a fifth aspect of the invention there is provided a method of treating an exhaust gas using apparatus according to the first, second or third aspect of the invention.

According to a sixth aspect of the invention there is provided a method of extracting an exhaust gas from a working environment at which the gas is generated, the method comprising capturing the exhaust gas as an exhaust gas flow, directing the captured exhaust gas flow for delivery into an air flow to dilute the exhaust gas, the air flow being along a flow path bounded by a side wall portion and the exhaust gas being delivered into the air flow adjacent the side wall portion whereby exhaust gas is into introduced into the air flow at the periphery thereof, and injecting water into the air flow, whereby there is confluence of air, exhaust gas and water discharging through an outlet as a fluid mixture.

According to a seventh aspect of the invention there is provided a method of treating an exhaust gas comprising capturing the exhaust gas as an exhaust gas flow, directing the captured exhaust gas flow for delivery into an air flow to dilute the exhaust gas, the air flow being along a flow path bounded by a side wall portion and the exhaust gas being delivered into the air flow adjacent the side wall portion whereby exhaust gas is into introduced into the air flow at the periphery thereof, and injecting water into the air flow, whereby there is confluence of air, exhaust gas and water discharging through an outlet as a fluid mixture.

According to an eighth aspect of the invention there is provided a method of extracting an exhaust gas from a working environment at which the gas is generated, the method comprising capturing the exhaust gas as an exhaust gas flow, directing the captured exhaust gas flow for delivery into an air flow to dilute the exhaust gas, cooling the exhaust gas prior to delivery into the air flow, wherein the exhaust gas is cooled by passing cooling water in heat exchange relation with the exhaust gas and also passing a cooling air flow in heat exchange relation with the exhaust gas.

According to a ninth aspect of the invention there is provided a method of treating an exhaust gas comprising capturing the exhaust gas as an exhaust gas flow, directing the captured exhaust gas flow for delivery into an air flow to dilute the exhaust gas, cooling the exhaust gas prior to delivery into the air flow, wherein the exhaust gas is cooled by passing cooling water in heat exchange relation with the exhaust gas and also passing a cooling air flow in heat exchange relation with the exhaust gas.

The cooling air flow may comprise an air flow which provides the air flow into which the captured exhaust gas flow is delivered.

The method according to the eighth or ninth aspect of the invention may further comprise injecting water into the air flow, whereby there is confluence of air, exhaust gas and water discharging through an outlet as a fluid mixture.

The water injected into the air flow may comprise a portion of the cooling water.

According to a tenth aspect of the invention there is provided a method of extracting an exhaust gas from a working environment at which the gas is generated, the method comprising capturing the exhaust gas as an exhaust gas flow, directing the captured exhaust gas flow for delivery into an air flow to dilute the exhaust gas, and cooling the exhaust gas prior to delivery into the air flow, the exhaust gas being delivered into the air flow angularly in a direction towards an outlet for the air flow.

According to an eleventh aspect of the invention there is provided a method of treating an exhaust gas comprising capturing the exhaust gas as an exhaust gas flow, directing the captured exhaust gas flow for delivery into an air flow to dilute the exhaust gas, and cooling the exhaust gas prior to delivery into the air flow, the exhaust gas being delivered into the air flow angularly in a direction towards an outlet for the air flow.

The method according to the tenth or eleventh aspect of the invention may further comprise injecting water into the air flow, whereby there is confluence of air, exhaust gas and water discharging through the outlet as a fluid mixture.

The injected water may assist in cooling the fluid mixture.

The injected water may also serve to dissolve a portion of the exhaust gas.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

In the drawings like structures are referred to by like numerals throughout the several views. The drawings shown are not necessarily to scale, with emphasis instead generally being placed upon illustrating the principles of the present invention.

Figure 1:
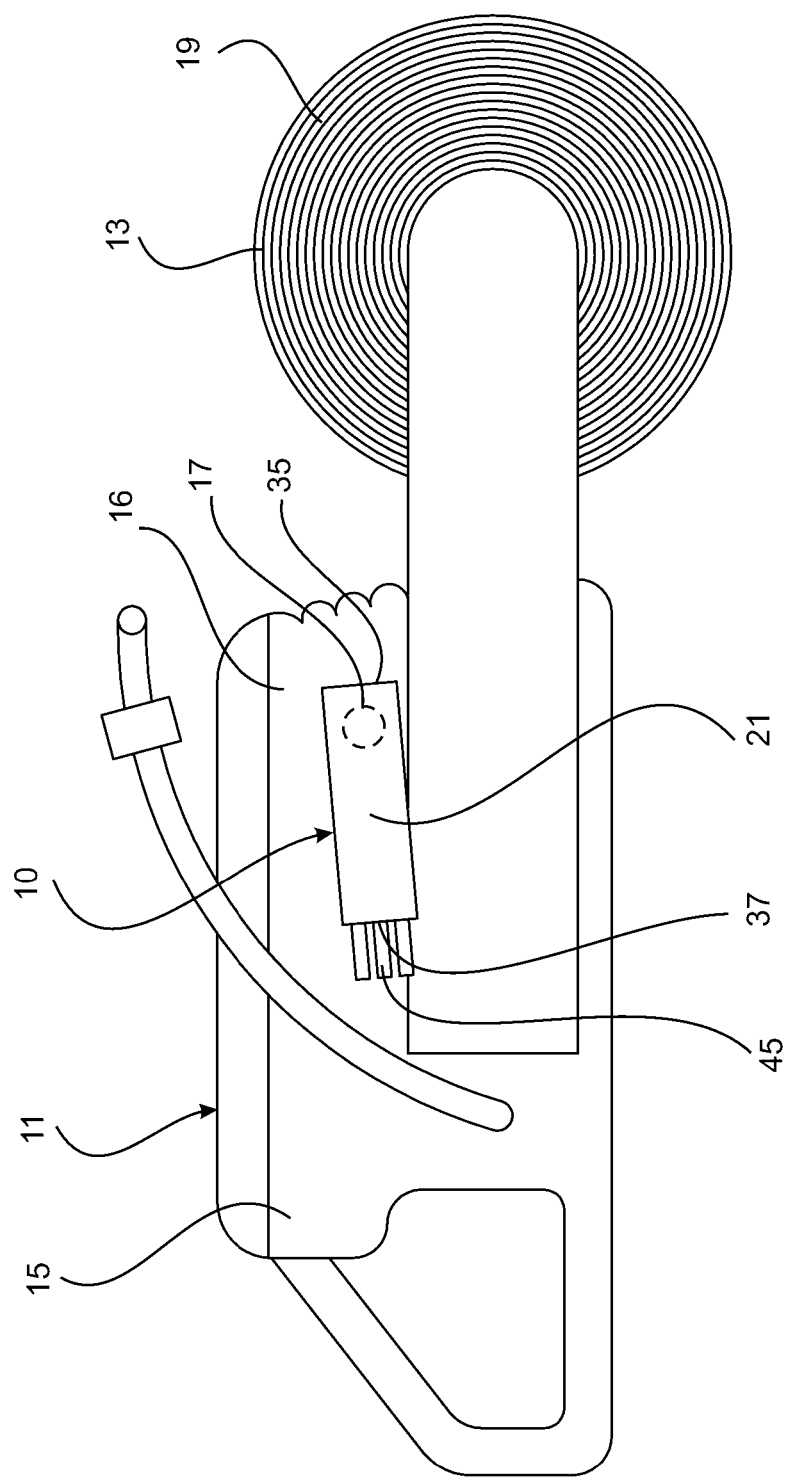
FIG. 1 is a schematic side elevational view showing a first embodiment of the extraction apparatus fitted onto a machine.

The figures depict several embodiments of the invention. The embodiments illustrates certain configurations; however, it is to be appreciated that the invention can take the form of many configurations, as would be obvious to a person skilled in the art, whilst still embodying the present invention. These configurations are to be considered within the scope of this invention.

DESCRIPTION OF EMBODIMENTS

In the following detailed description, the specific exemplary embodiments of the present invention are described in connection with its preferred embodiments. However, to the extent that the following description is specific to a particular embodiment or a particular use of the present techniques, it is intended to be illustrative only and merely provides a concise description of the exemplary embodiments. Accordingly, the present invention is not limited to the specific embodiments described below, but rather; the invention includes all alternatives, modifications, and equivalents falling within the true scope of the appended claims.

Referring to FIGS. 1 to 6 of the drawings, there is shown a first exemplary embodiment of an extraction apparatus 10. The extraction apparatus 10 is an attachment for a cutting machine 11 for performing cutting and chasing operations on wall and floor surfaces.

The cutting machine 11 typically comprises a work head 13 and a body 15 carrying the work head. The body 15 incorporates a drive unit in the form of an internal combustion engine 16 (typically a petrol engine) having an exhaust 17 (hidden in FIG. 1 by the apparatus 10 but depicted in dotted outline). The work head 13 receives and supports a cutting tool 19, typically in the form of a cutting blade.

Figure 2:
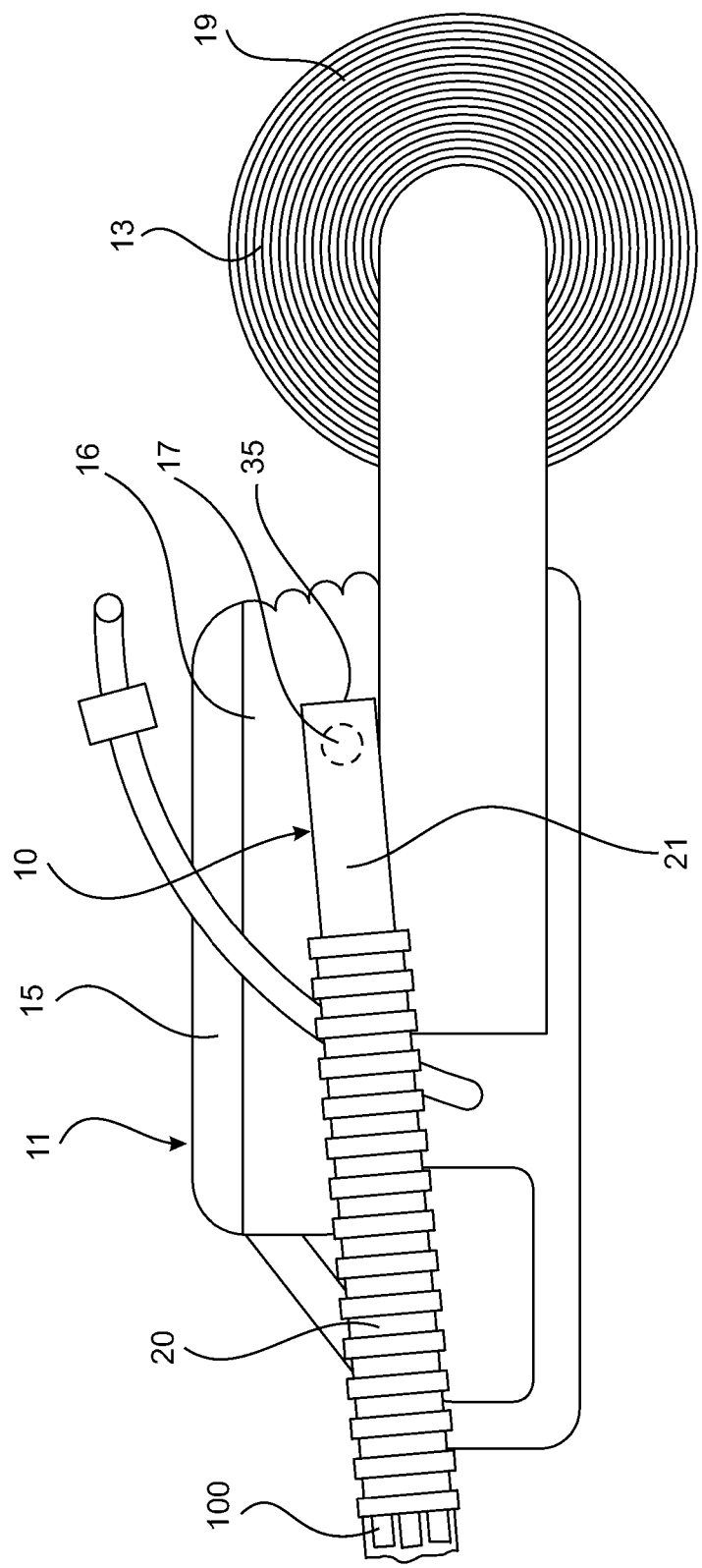
FIG. 2 is a view similar to FIG. 1 but with a section of extraction hose shown fitted onto the extraction apparatus and part of the extraction hose shown cut-way to reveal internal water hoses which are also connected to the extraction apparatus
Figure 3:
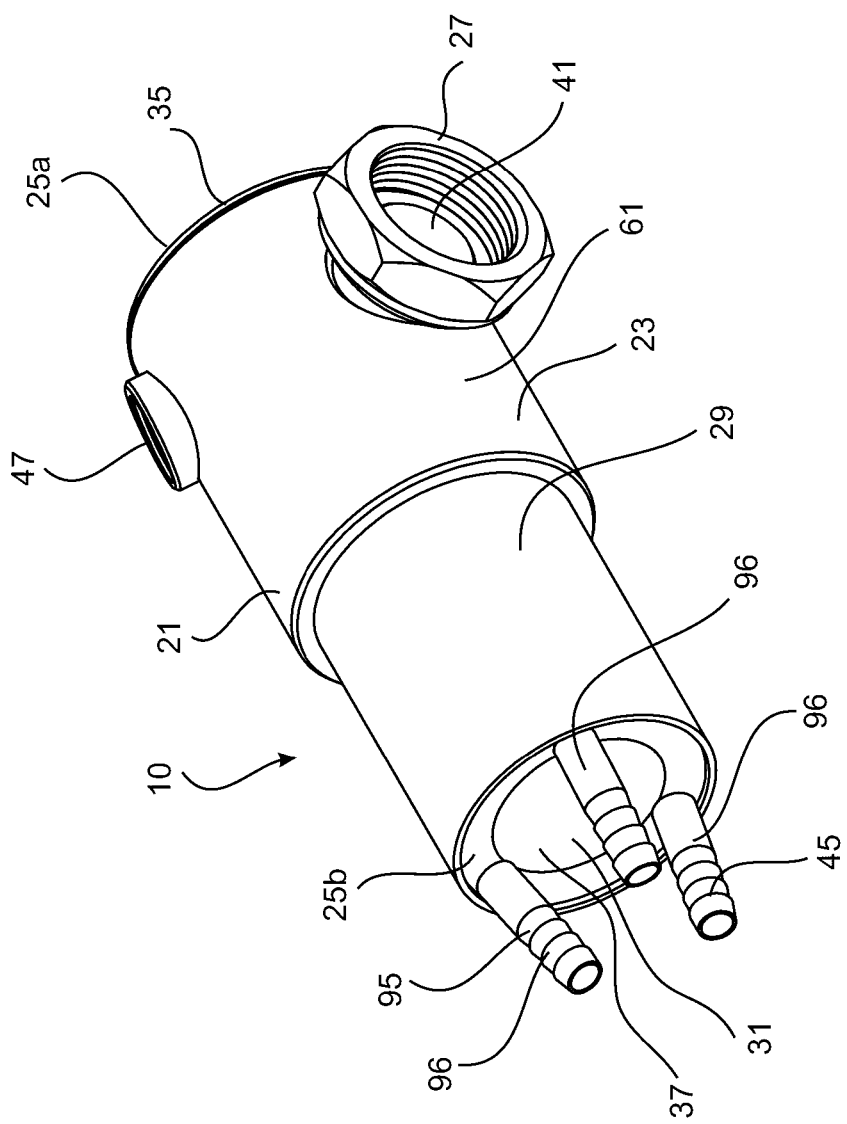
FIG. 3 is a perspective view of the extraction apparatus.
Figure 4:
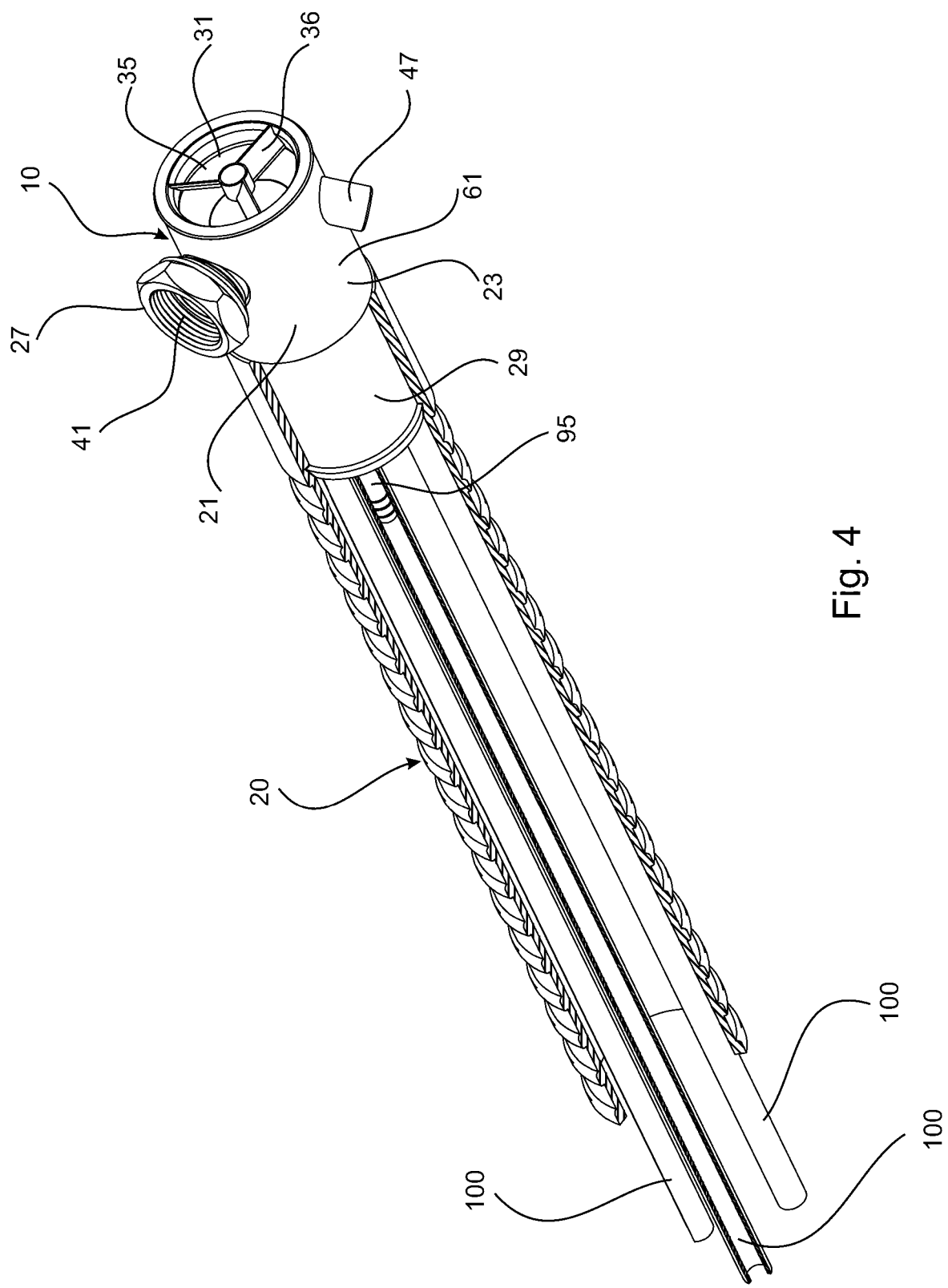
FIG. 4 is a perspective view of the extraction apparatus, together with a section of extraction hose fitted onto the extraction apparatus, with part of the extraction hose shown cut-way to reveal the internal water hoses also connected to the extraction apparatus.

The extraction apparatus 10 is adapted to capture exhaust gas emitted through the exhaust port 17 of the engine 16 and to dilute the exhaust gas by mixing with air and also cool the exhaust gas. The diluted exhaust gas is conveyed along a discharge line which in the arrangement shown comprises an extraction hose 20 (as shown in FIGS. 2 and 4). The extraction hose 20 extends to a location away from the working environment in which the cutting machine 11 is operating. In this way, the captured exhaust gases are conveyed away from the working environment. In this embodiment, the extraction hose 20 comprises a suction hose connected to a suction source (not shown). Other arrangements are, of course, possible; for example, the extraction hose may be operable in conjunction with an air pressure source, such as a blower, to generate an air flow within the extraction apparatus 10 for conveying the diluted exhaust gas along the extraction hose It is desirable that the exhaust gas be cooled to an extent such that the extraction hose 20 can be handled safely by a user. Further, it is desirable that the exhaust gas be cooled to an extent such that is does not cause heat damage to the extraction hose 20.

The exhaust gas is cooled using the cooling effects of the air, and also using the cooling effects of water in heat exchange relation with the exhaust gas prior to mixing thereof with the air. The mixture of exhaust gas and air is cooled using the cooling effects of water in heat exchange relation with the mixture. There is also injection of water into the air, which may assist further cooling of the mixture and may also serve to dissolve a portion of the exhaust gases, thereby further providing environmental benefits. Water may also assist in cooling the exterior of the extraction apparatus 10, or at least that part of exterior of the apparatus 10 likely to come into contact with a user of the cutting machine 11.

The extraction apparatus 10 comprises an elongate body 21 having a side wall structure 23 and two ends 25.

The side wall structure 23 incorporates a coupling 27 for attachment of the apparatus 10 to the cutting machine 11 to receive and capture exhaust gas emitted from the exhaust 17 during operation of the machine 11, as will be explained in more detail later.

The side wall structure 23 is configured to define a tail portion 29 onto which the adjacent end of the extraction hose 20 can be fitted, as best seen in FIG. 4.

Figure 5:
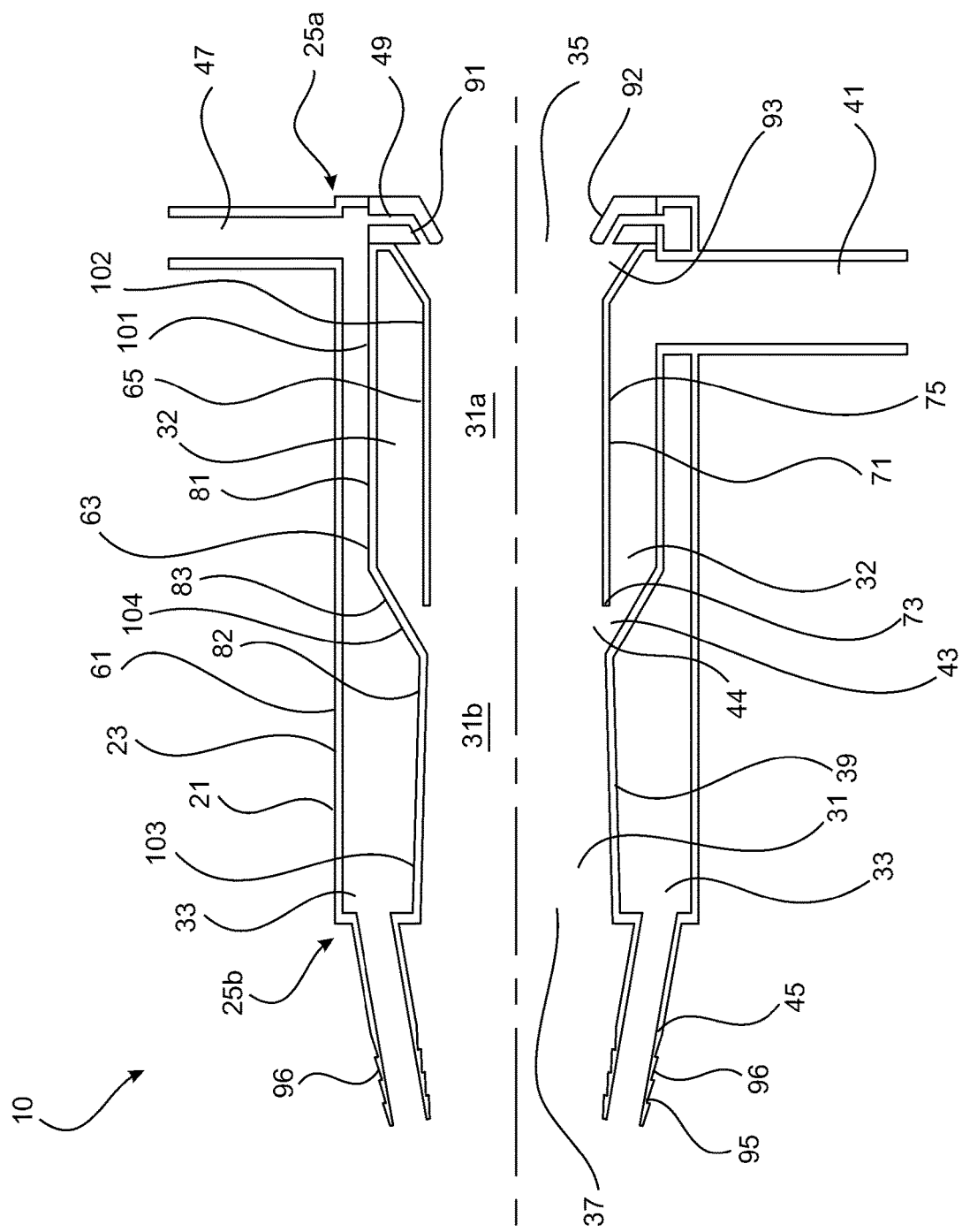
FIG. 5 is a schematic longitudinal section view of the first embodiment of the extraction apparatus.

The body 21 defines a first flow path 31, a second flow path 32, and a third flow path 33, as depicted schematically in FIG. 5. FIG. 5 is a schematic longitudinal section view of the first exemplary embodiment of the extraction apparatus 10, illustrating certain, but not all, features of the embodiment; for example, for the purposes of clarity in the drawing the tail portion 29 of the wall structure 23 is not depicted.

The first flow path 31 extends axially through the elongate body 21 between the two ends 25. The first flow path 31 has an inlet 35 at one end 25*a* and an outlet 37 at the other end 25*b*. The inlet 35 is open to atmosphere to receive ambient air and the outlet 37 is adapted for connection to extraction hose 20. The first flow path 31 is bounded by a side wall portion 39, as will be explained in more detail later.

The second flow path 32 is disposed circumferentially about a portion of the first flow path 31, and has an inlet 41 associated with the coupling 27 and an outlet 43 opening onto the first flow path 31. With this arrangement, the second flow path 32 is adapted to receive exhaust gas emitted by the internal combustion engine 16. The outlet 43 provides a delivery outlet, the purpose of which will described in more detail.

The delivery outlet 43 establishes a delivery zone 44 at which the second flow path 32 communicates with the first flow path 31 to deliver exhaust gas into the first flow path 31 for mixing with an air flow along the first flow path 31. The second flow path 32 opens onto the first flow path 31 through side wall portion 39, whereby the delivery zone 44 is disposed adjacent the side wall portion 39. With this arrangement, the exhaust gas is introduced into the first flow path 31 at the periphery (side boundary) of the air flow along the first flow path 31. The delivery outlet 43 in effect divides the first flow path 31 into an upstream section 31*a* extending from the inlet 35 and a downstream section 31*b* extending to the outlet 37.

The third flow path 33 is disposed circumferentially about the first flow path 31 and the second flow path 32. The third flow path 33 has an inlet 45, a discharge outlet 47 and a delivery outlet 49. The third flow path 33 extends substantially the full length of the elongate body 21 and is disposed adjacent the side wall structure 23, with the inlet 45 being adjacent one end 25*b* of the elongate body and the discharge outlet 47 being adjacent the other end 25*a* of the elongate body, as shown in FIG. 5.

The extraction apparatus 10 has provision to influence the flow pattern of air flow upstream of the delivery zone 44 at which exhaust gas in delivered into the flow; that is, flow along the upstream section 31*a* of the flow path 31. In the arrangement shown, such provision features a flow control device 36 associated with the inlet 35, as will be described in more detail later. The can be seen in FIGS. 4 and 6, but is not shown in FIG. 5.

The wall structure 23 defines an external wall which extends between the two ends 25 and which constitutes an exterior wall 61. The body 21 further comprises a first interior wall 63 and a second interior wall 65.

In the arrangement shown, the elongate body 21 is generally cylindrical, and the exterior wall 61 and the two interior walls 63, 65 are generally circular in cross-section.

With this arrangement, the first flow path 31 is generally circular in cross-section, and the second and third flow paths 32, 33 are generally annular in cross-section.

The third flow path 33 is defined between the exterior wall 61 and the first interior wall 63.

The second flow path 32 is defined between the first interior wall 63 and the second interior wall 65.

The second interior wall 65 is configured as a cylindrical portion 71 extending inwardly from the inlet 35 and terminating at an end 73. The cylindrical portion 71 defines a peripheral boundary wall 75 for the adjacent upstream section 31*a* of the first flow path 31. With this arrangement, the peripheral boundary wall 75 defines part of the side wall portion 39 of first flow path 31.

The first interior wall 63 comprises a first end section 81, a second end section 82 and an intermediate section 83 between the two end sections 81, 82.

The first end section 81 is disposed adjacent the inlet end 25*a* and surrounds the second interior wall 65.

The second end section 82 is disposed adjacent the outlet end 25*b*. With this arrangement, the second end section 82 surrounds the adjacent downstream section 31*b* of the first flow path 31. The second end section 82 extends to the outlet 37 and increases progressively in cross-sectional area from the intermediate section 83 to the outlet 37, as seen in FIG. 5. With this arrangement, the adjacent downstream section 31*b* of the first flow path 31 diverges in the direction of flow from the delivery port 43 towards the outlet 37.

The first end section 81 and the second end section 82 are radially offset with respect to each other, with the intermediate section 83 providing a transition between the two offset end sections. The offsetting arrangement provides space within the elongate body 21 to accommodate the second interior wall 65 as well as the second flow path 32 defined between the two interior walls 63, 65.

The end 73 of the second interior wall 65 is spaced from the first interior wall 63 to define the delivery port 43. More particularly, the delivery port 43 is defined between the end 73 of the second interior wall 65 and the angularly disposed intermediate section 83, as best seen in FIG. 5. With this arrangement, delivery port 43 is configured as an annular port disposed circumferentially about the boundary of the first flow path 31, whereby the delivery zone 44 comprises an annular zone extending around air flow along the first flow path 31.

In this embodiment, the side wall portion 39 bounding the first flow path 31 is defined by the first interior wall 63 and the second interior wall 65 in combination, with the annular delivery port 43 between the second interior wall 65 and the first interior wall 63. The delivery port 43 between the second interior wall 65 and the first interior wall 63 provides for the second flow path 32 to open onto the first flow path 31 through the side wall portion 39, whereby the delivery zone 44 is adjacent the side wall portion 39. In this way, the second interior wall 65 (which defines the peripheral boundary wall 75), and the second end section 82 of the first interior wall 63, cooperate to define part of the side wall portion 39 of first flow path 31.

The extraction apparatus 10 may be configured to avoid development of negative pressure at the exhaust 17 of an engine 16 on which the apparatus is installed. Such a negative pressure at the exhaust 17 is believed to affect engine performance. In particular, negative pressure at the exhaust 17 of the engine 16 can lead to an increase in engine speed when the engine is operating at idle or just "ticking-over". This can be undesirable, and indeed dangerous, in certain applications. This is the case with the present cutting machine 11, as an example, where the engine 16 has a centrifugal clutch (not shown) for coupling the drive output of the engine 16 to the workhead 13 for rotating the cutting tool 19. An increase in engine speed can cause unintentional activation of the centrifugal clutch, thereby driving the cutting tool 19 unexpectedly. An arrangement in which there is appropriate back-pressure at the exhaust 17 of an engine 16 seeks to ensure that the engine 16 operates as intended.

The apparatus 10 may be so configured by appropriate sizing of the first flow path 31. Specifically, by sizing of the first flow path 31 such that the minimum cross-sectional flow area of the downstream section 31b of the first flow path 31 defined by the first interior wall 63 is at least substantially equal to or larger than the minimum cross-sectional flow area of the upstream section 31a of the first flow path 31 defined by the second interior wall 65. In the arrangement shown, the cross-sectional flow area of downstream section 31b of the first flow path 31 is at a minimum at a point adjacent delivery port 43, and that minimum cross-sectional flow area is substantially equal to the minimum cross-sectional flow area of upstream section 31a of the first flow path 31 defined by the second interior wall 65, as can be been schematically in FIG. 5. In relation to the downstream section 31b of the first flow path 31, it can be seen in FIG. 5 that the cross-sectional flow area increases progressively from the minimum at the point adjacent delivery port 43 as the first flow path 31 diverges in the direction of flow from the delivery port towards the outlet 37.

The annular delivery port 43 is configured to establish a low pressure region within the of the first flow path 31 at or adjacent the delivery zone 44. The establishment of such a low pressure region may assist in promoting flow from the inlet 35 of the first flow path 31; that is, the presence of the low pressure region may assist in ambient air being drawn into the inlet 35 from atmosphere.

In this embodiment, the configuration of the delivery port 43 to establish a low pressure region within the first flow path 31 at or adjacent the delivery zone 43 involves an arrangement to direct exhaust gas entering the first flow path 31 at the delivery zone 44 angularly in a direction towards the outlet 37 of the first flow path 31. The delivery velocity of exhaust gas entering the first flow path 31 at the delivery zone 44 is also believed to contribute to the establishment of a low pressure region within the of the first flow path 31 at or adjacent the delivery zone.

In the arrangement shown, such configuration of the delivery port 43 involves an arrangement to direct exhaust gas entering the first flow path 31 at the delivery zone 44 angularly in a direction towards the outlet 37 of the first flow path 31. The angularly disposed intermediate section 83 of the first interior wall 63 is influential in this arrangement to direct exhaust gas entering the first flow path 31 at the delivery zone 44 angularly in a direction towards the outlet 37 of the first flow path 31. With this arrangement, the angularly disposed intermediate section 83 provides the delivery port 43 with an angularly disposed wall surface for directing exhaust gas entering the first flow path at the delivery zone angularly in a direction towards the outlet of the first flow path.

The adjacent end 73 of the second interior wall 65 may also be configured to promote flow of exhaust gas entering the first flow path 31 at the delivery zone 44 angularly in a direction towards the outlet 37 of the first flow path. By way of example, the adjacent end 73 of the second interior wall 65 may be chamfered.

The third flow path 33 incorporates delivery outlet 49 for delivery of water into an air flow along the first flow path 31.

In the arrangement shown, the delivery outlet 49 is arranged to deliver water by injection as a spray into an air stream upon entry of the air stream through the inlet 35; that is, at or adjacent the inlet 35. The delivery outlet 49 may be configured as one or more jets 91 for injecting water under pressure into the air stream. In the arrangement shown, there is a plurality of jets 91 disposed at intervals circumferentially about the first flow path 31.

The delivery outlet 49 is arranged to delivery water into the first flow path 31 with a directional component in the direction of flow from the inlet 35 to the outlet 37. Accordingly, the delivery jets 91 are disposed angularly to inject water inwardly with a directional component in the intended direction.

The inlet 35 is configured as a convergent nozzle 92, whereby a low pressure zone 93 is generated in the air flow along the first flow path 31 downstream of the convergent nozzle. The delivery outlet 49 is adapted to deliver of water into the low pressure zone 93. This may provide a venturi effect for assisting in the delivery of water into, and mixing of the water with, the air flow along the first flow path 31. The end section of the second interior wall 65 adjacent the convergent nozzle 92 is of tapered configuration to create a space around which the low pressure zone 93 can be established.

The water flow along the third flow path 33 not only provides water to the delivery outlet 49 but also provide water for cooling purposes. For this purpose, the quantity of water provided to the third flow path 31 may exceed requirements at the delivery outlet 49, with surplus water being discharged from the third flow path 33 through discharge outlet 47 to carry away heat.

The inlet 45 comprises a plurality of inlet portions 95 each configured as a coupling in the form of a nozzle fitting 96 for connection to a respective water supply line such as a delivery hose 100, as shown in FIGS. 2 and 4.

The provision of a plurality of inlet portions 95 may be advantageous in ensuring an adequate supply of water under pressure to the third flow path 33 to satisfy water demand for both supply to the delivery outlet 49 and also surplus water for cooling purposes, with the surplus water being discharged from the third flow path 33 through discharge outlet 47 to carry away absorbed heat.

In the arrangement shown, there are three nozzles 96 and three water supply hoses 100 each connected to a respective one of the nozzles. The water supply hoses 100 are accommodated within and extend along the interior of the extraction hose 20, as shown in FIGS. 2 and 4. In this way, there is a single hose assembly comprising the extraction hose 20 and the water supply hoses 100 within the extraction hose 20. This can be useful, as the single hose assembly may be easier to manage and store as opposed to various separate hoses; for example, the single hose assembly may be easier for a user to manage on a work site, and to also carry to and from the worksite.

The construction of the extraction apparatus 10 facilitates capturing an exhaust gas from the exhaust port 17 of the engine 16 and mixing air with the exhaust gas for diluting the exhaust gas and for cooling the exhaust gas. The cooling is provided by the cooling effects of the air and also the cooling effects of water in heat exchange relation with the exhaust gas prior to mixing thereof with the air, and also cooling the mixture of exhaust gas and air using the cooling effects of water in heat exchange relation with the mixture, and also injection of water into the air. The injection of water may assist further cooling of the mixture and may also serve to dissolve a portion of the exhaust gases.

In relation to cooling, the construction of the extraction apparatus 10 provides various cooling surfaces to which the exhaust gas is exposed within the body 21 before being discharged as part of the fluid mixture through the outlet 37 and conveyed way along the discharge line (extraction hose 20). Cooling of the exhaust gas is important, as it is necessary for the fluid mixture discharging through the outlet 37 and being conveyed way along the discharge line (extraction hose 20) to be sufficiently cool so as to not cause damage to the discharge line and any associated fittings and componentry, as well as the suction source (in the case where the extraction hose comprises a suction hose). There is also cooling of the exterior wall 61 of the body 21 which can come into contact with a user while the extraction apparatus 10 is in operation.

More particularly, the body 21 includes first cooling surface 101, second cooling surface 102, third cooling surface 103, and fourth cooling surface 104.

The first cooling surface 101 is defined by first end section 81 of the first interior wall 63 and is exposed to hot exhaust gas flowing along the second flow path 32. The cooling surface 101 is cooled by virtue of the cooling effect of cold water flowing through the third flow path 33. The hot exhaust gas flowing along the second flow path 32 is exposed to the cooling surface 101, with the cooling surface absorbing heat from the hot exhaust gas. In other words, the first end section 81 of the first interior wall 63 providing the cooling surface 101 is in heat exchange relationship with the hot exhaust gas. Heat extracted from the hot exhaust gas at the cooling surface 101 is transferred through the first end section 81 of the first interior wall 63 and absorbed by the cold water flowing through the third flow path 33, the cold water being in heat exchange relationship with the first end section 81 of the first interior wall 63.

The second cooling surface 102 is defined by the second interior wall 65 and is exposed to hot exhaust gas flowing along the second flow path 32. The second cooling surface 102 is cooled by virtue of the cooling effect of a fluid mixture of air and injected water flowing along the adjacent upstream section 31a of the first flow path 31. The air comprises ambient air drawn from atmosphere through the inlet 35 and the injected water comprises water delivered via delivery outlet 49. The hot exhaust gas flowing along the second flow path 32 is exposed to the cooling surface 102, with the cooling surface absorbing heat from the hot exhaust gas. In other words, the second interior wall 65 providing the second cooling surface 102 is in heat exchange relationship with the hot exhaust gas. Heat extracted from the hot exhaust gas at the cooling surface 102 is transferred through the second interior wall 65 and absorbed by the fluid mixture of air and injected water flowing along the first flow path 31, the fluid mixture being in heat exchange relationship with the second interior wall 65.

The third cooling surface 103 is defined by second end section 82 of the first interior wall 63 and is exposed to the fluid mixture of exhaust gas, air and injected water flowing along the adjacent downstream section 31b of the first flow path 31. At this stage, the exhaust gas is still hot, notwithstanding that (i) it has been cooled somewhat through the earlier exposure to cooling surfaces 101, 102 and (ii) it has also been cooled somewhat through mixing with the air and injected water. Consequently, the fluid mixture of exhaust gas, air and injected water flowing along the adjacent downstream section 31b of the first flow path 31 is hot and can be cooled somewhat through exposed to the cooling surface 103. The cooling surface 103 is cooled by virtue of the cooling effect of cold water flowing through the third flow path 33. More particularly, the hot exhaust gas flowing along the downstream section 31b of the first flow path 31 is exposed to the cooling surface 103, with the cooling surface absorbing heat from the hot fluid mixture and therefore cooling it somewhat prior to the fluid mixture exiting through the outlet 37 and entering the discharge line (extraction hose 20). In other words, the second end section 82 of the first interior wall 63 providing the cooling surface 103 is in heat exchange relationship with the hot fluid mixture. Heat extracted from the hot fluid mixture at the cooling surface 103 is transferred through the second end section 82 of the first interior wall 63 and absorbed by the cold water flowing through the third flow path 33, the cold water being in heat exchange relationship with the second end section 82 of the first interior wall 63.

The flow of cold water flowing through the third flow path 33 also has a cooling effect on the side wall structure 23 of the elongate body 21. This is because the third flow path 33 extends substantially the full length of the elongate body 21 and is disposed adjacent the side wall structure 23. In this way, there can be cooling of the exterior wall 61 of the body 21 which can come into contact with a user while the extraction apparatus 10 is in operation.

The fourth cooling surface 104 is disposed adjacent the delivery outlet 43 for exposure to exhaust gas flowing to and through the delivery outlet. The intermediate section 83 of the first interior wall 63 defines the fourth cooling surface 104. The fourth cooling surface 104 is cooled by virtue of the cooling effect of cold water flowing through the third flow path 33. In many respects, the fourth cooling surface 104 is, in effect, an extension of the first cooling surface 101.

Further, construction of the extraction apparatus 10 facilitates delivery of the exhaust gas into the fluid mixture of air and injected water flowing along the upstream section 31a of the first flow path 31 at the perimeter of the flow. In the arrangement described, the delivery of the exhaust gas into the fluid mixture is at an annular zone extending around the flow. More particularly, the delivery of the exhaust gas into the fluid mixture is through delivery outlet 43 configured as an annular port disposed circumferentially about the boundary of the first flow path 31.

The annular delivery port 43 is configured to establish a low pressure region to promote mixing of delivered exhaust gas with the fluid mixture of air and injected water flowing along the upstream section 31a of the first flow path 31, thereby to dilute the exhaust gas, as well as promoting flow from the inlet 35 of the first flow path 31, as previously explained.

A portion of the exhaust gas may also be dissolved by the injected water, thereby further providing environmental benefits.

As mentioned above, there is has provision to influence the flow pattern of air flow upstream of the delivery zone 44 at which exhaust gas in delivered into the flow, with such provision in the arrangement shown featuring flow control device 36, as shown in FIG. 4.

The flow control device 36 is configured to generate a swirling or similar effect in flow along the flow path. The effect may assist in promoting mixing of water delivered into the first flow path with air flow therealong. Further, the effect may assist in promoting thermal effects of the air flow and resultant fluid mixture of air and water; that is, the cooling influence of the flow. Still further, the flow control device 36 may assist generally in achieving effective mixing between the air, exhaust gas and injected water, with the aim of avoiding development of hot spots in the extraction hose 20.

Figure 6:
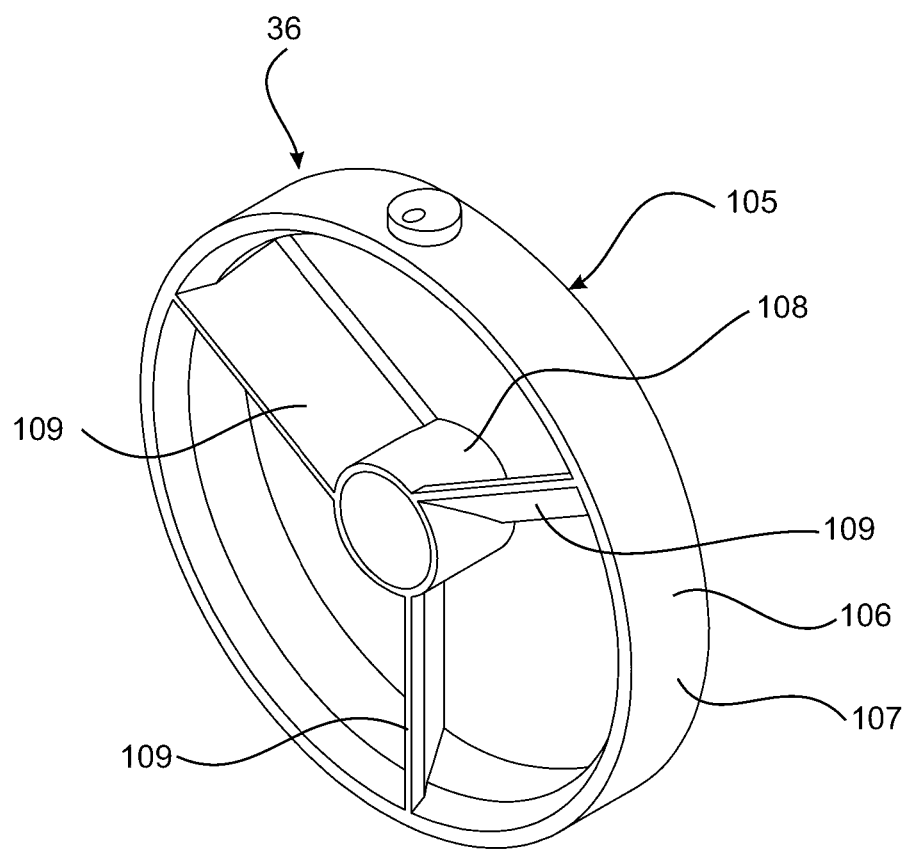
FIG. 6 is a perspective view of a vane structure forming part of the extraction apparatus to induce a swirling effect in an air flow induced within the extraction apparatus prior to delivery of exhaust gas into the air flow.

The flow control device 36 may comprise a vane assembly 105, which is shown in FIG. 6 and which comprises at least one vane over which the flow can pass. In the arrangement shown, the vane assembly 105 comprises a body 106 having an outer portion configured as a support ring 107, an inner portion configured as a central hub 108 having a central flow passage, and a plurality of vanes 109 extending between the inner and outer portions.

Typically, the flow control device 36 is disposed at or adjacent the inlet 35 of the first flow path 31, as shown in FIG. 4.

The flow control device 36 may also have provision for delivery of water into the air flow. The delivery of water may be by way of one or more water galleries and associated delivery outlets or nozzles integrated into the body 106 of the flow control device 36. Delivery of water into the air flow in this manner may supplement, or indeed replace, other arrangements previously described and illustrated for delivery of water into the first flow path 31.

In operation of this exemplary embodiment, the extraction apparatus 10 is installed on the engine 16 of the cutting machine 11, with the coupling 27 attached to the exhaust 17 such that the inlet 41 of the second flow path 32 is in fluid communication with the exhaust 17 to receive exhaust gas emitted thought the exhaust. Further, a suction source is in fluid communication with the first flow path 31 by way of the extraction hose 20 connected to the outlet 37. With this arrangement, suction applied to the outlet 37 induces air flow through the inlet 35, which is open to atmosphere to receive ambient air. The consequent air flow along the first flow path 31 receives injected water and exhaust gas, as previously described, and the fluid mixture so formed is extracted under suction through the outlet 37 and conveyed along the extraction hose 20 to a disposal zone away from the working environment in which the cutting machine 11 is operating. At the disposal zone, the fluid mixture may be discharged to atmosphere or treated in some way; for example, treatment by way of a process to remove water and particulate matter before the remnant fluid material is discharged to atmosphere. The extent to which exhaust gas is released to atmosphere may be reduced by virtue of a portion of the exhaust gas having been dissolved in the injected water. This may offer environmental benefits as a reduced amount of exhaust gas would be discharged to atmosphere.

With use of this exemplary embodiment of the extraction apparatus 10, exhaust gas from the exhaust 17 is captured as an exhaust gas flow and the captured exhaust gas flow is directed for delivery into an air flow to dilute the exhaust gas. The exhaust gas is cooled somewhat prior to delivery into the air flow by passing cooling water in heat exchange relation with the exhaust gas and also passing a cooling air flow in heat exchange relation with the exhaust gas. Water is also delivered into the air flow, which further assists in cooling the flow. The injected water may also serve to dissolve a portion of the exhaust gas. There is confluence of air, exhaust gas and water discharging through the outlet 37 as a fluid mixture. Prior to the fluid mixture discharging through the outlet 37, the fluid mixture is cooled somewhat by passing cooling water in heat exchange relation with the fluid mixture. In this way, the exhaust gas is cooled to an extent such that is not likely to cause damage to the extraction hose 20.

In this first embodiment, there is provision for delivery of water into the air flow along the first flow path 31 during movement of the air flow along the first flow path. Other arrangements are possible; for example, there may be provision for delivery of water into the air flow along the first flow path 31 prior to, during, or both prior to and during, movement of the air flow along the first flow path. In one arrangement, the delivery outlet 49 may be arranged to deliver water into an air stream upon or after entry of the air stream through the inlet 35; that is, at or downstream of the inlet 35, as is the case with this embodiment. In another arrangement, the delivery outlet 49 may be arranged to deliver water into an air stream prior to entry of the air stream through the inlet 35; that is, upstream of the inlet.

Figure 7:
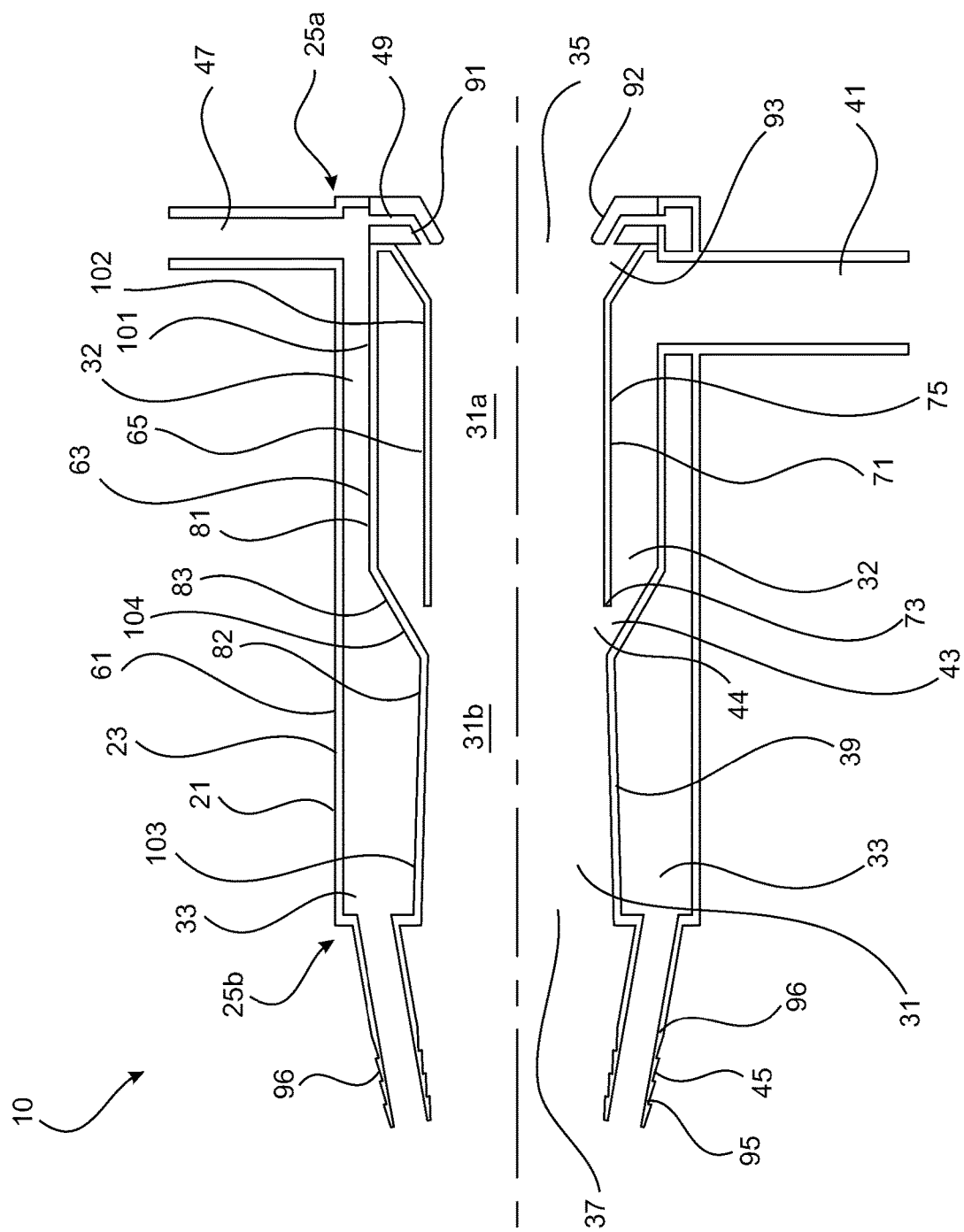
FIG. 7 is a longitudinal sectional view of a second embodiment of the extraction apparatus.

Referring now to FIG. 7, there is shown a second exemplary embodiment of extraction apparatus 10. The second exemplary e embodiment of extraction apparatus 10 is similar in many respects to the first exemplary embodiment described above and so similar reference numerals are used to identify similar parts. In this second exemplary embodiment, the exhaust apparatus 10 is modified to provide an increased delivery gap at annular delivery port 43.

Figure 8:
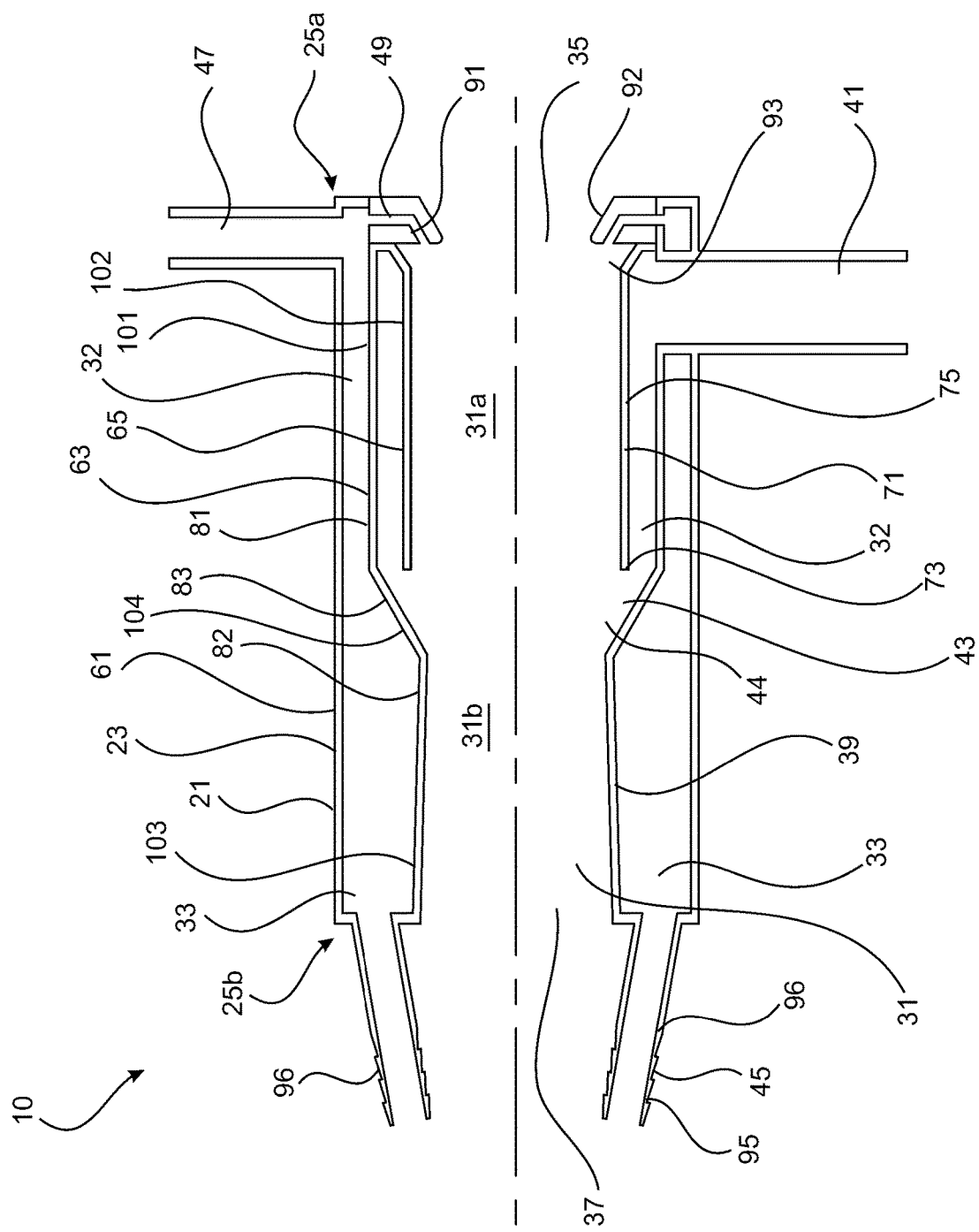
FIG. 8 is a longitudinal sectional view of a third embodiment of the extraction apparatus.

Referring now to FIG. 8, there is shown a third exemplary embodiment of extraction apparatus 10. The third exemplary embodiment of extraction apparatus 10 is similar in many respects to the first exemplary embodiment described above and so similar reference numerals are used to identify similar parts. In this third exemplary embodiment, the exhaust apparatus 10 is modified to provide an increased air intake arrangement. More particularly, the inlet 35 and the adjacent section 31a of the first flow path 31 are of increased cross-sectional flow areas. With this arrangement, the section 31a of the first flow path 31 is of larger cross-sectional flow area that the downstream section 31b of the first flow path 31. In other words, in contrast to other embodiments, this embodiment does not incorporate the feature of sizing of the first flow path 31 such that the minimum cross-sectional flow area of that section 31b of the first flow path 31 defined by the first interior wall 63 is at least substantially equal to or larger than the minimum cross-sectional flow area of that section 31a of the first flow path 31 defined by the second interior wall 65.

Figure 9:
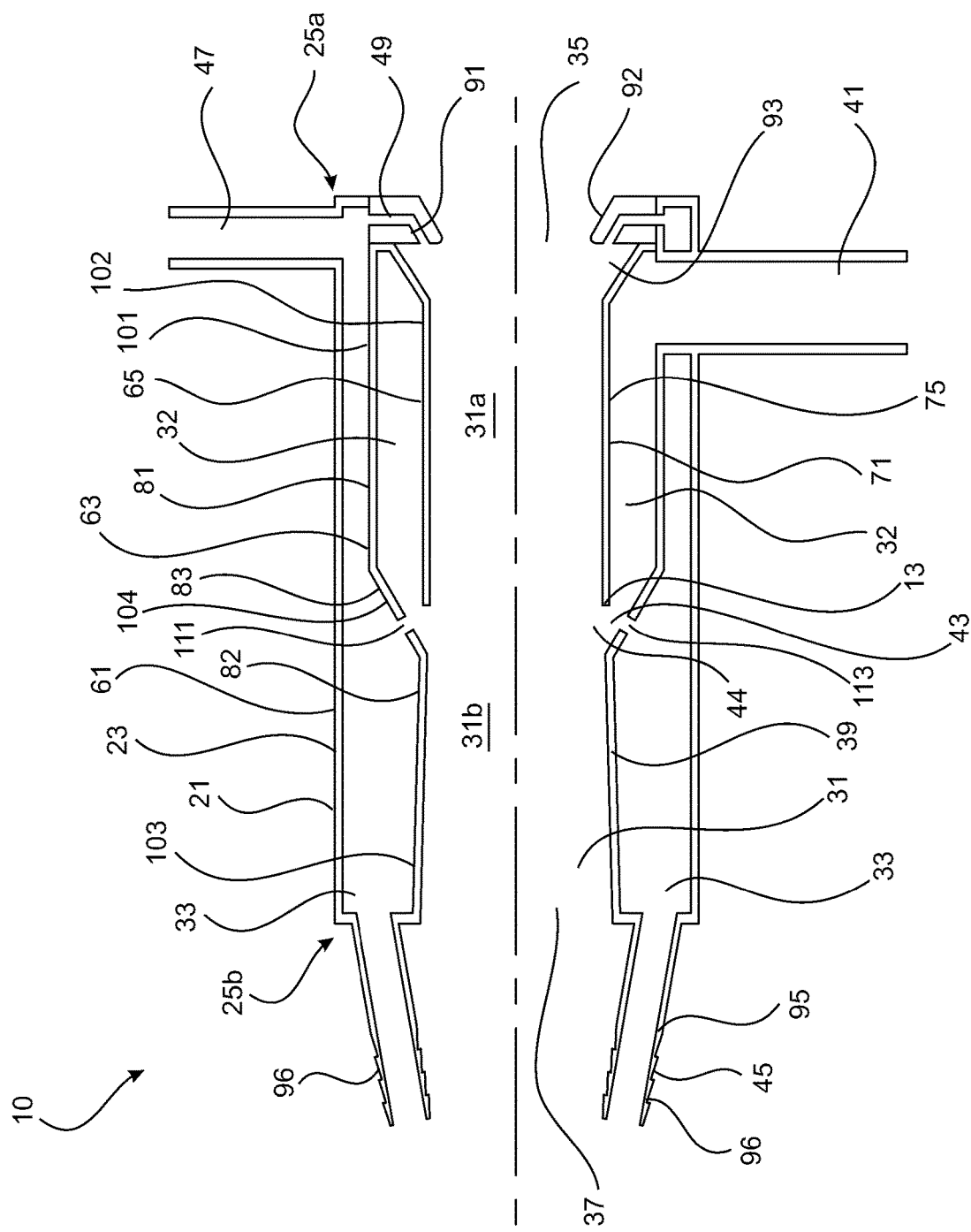
FIG. 9 is a longitudinal sectional view of a fourth embodiment of the extraction apparatus.

Referring now to FIG. 9, there is shown a fourth exemplary embodiment of extraction apparatus 10. The fourth exemplary embodiment of extraction apparatus 10 is similar in many respects to the first exemplary embodiment described above and so similar reference numerals are used to identify similar parts. In this fourth exemplary embodiment, the exhaust apparatus 10 is modified to provide the third flow path 33 with a further delivery outlet 111 arranged to deliver water directly into the exhaust gas flow at a zone adjacent the adjacent the delivery zone 44 at which exhaust gas is delivered into flow within the first flow path 31. In the arrangement illustrated, the further delivery outlet 111 comprises a plurality of delivery ports 113 at circumferentially spaced intervals around the intermediate section 83 of the first interior wall 63. With this arrangement, cooling water is introduced through the delivery ports 113 to a location likely to be one of the hottest zones within the body 21.

Accordingly, this embodiment has provision for delivery of water into the air flow along the first flow path 31 and also directly into the exhaust gas. Water may be delivered directly into the airflow prior to, during, or both prior to and during, delivery of the exhaust gas into the first flow path, according to the particular location of the further delivery outlet 111.

It is believed that delivery of water directly into the exhaust gas may be advantageous, as the hot exhaust gas may provide a more reactive environment into which water is injected.

Figure 10:
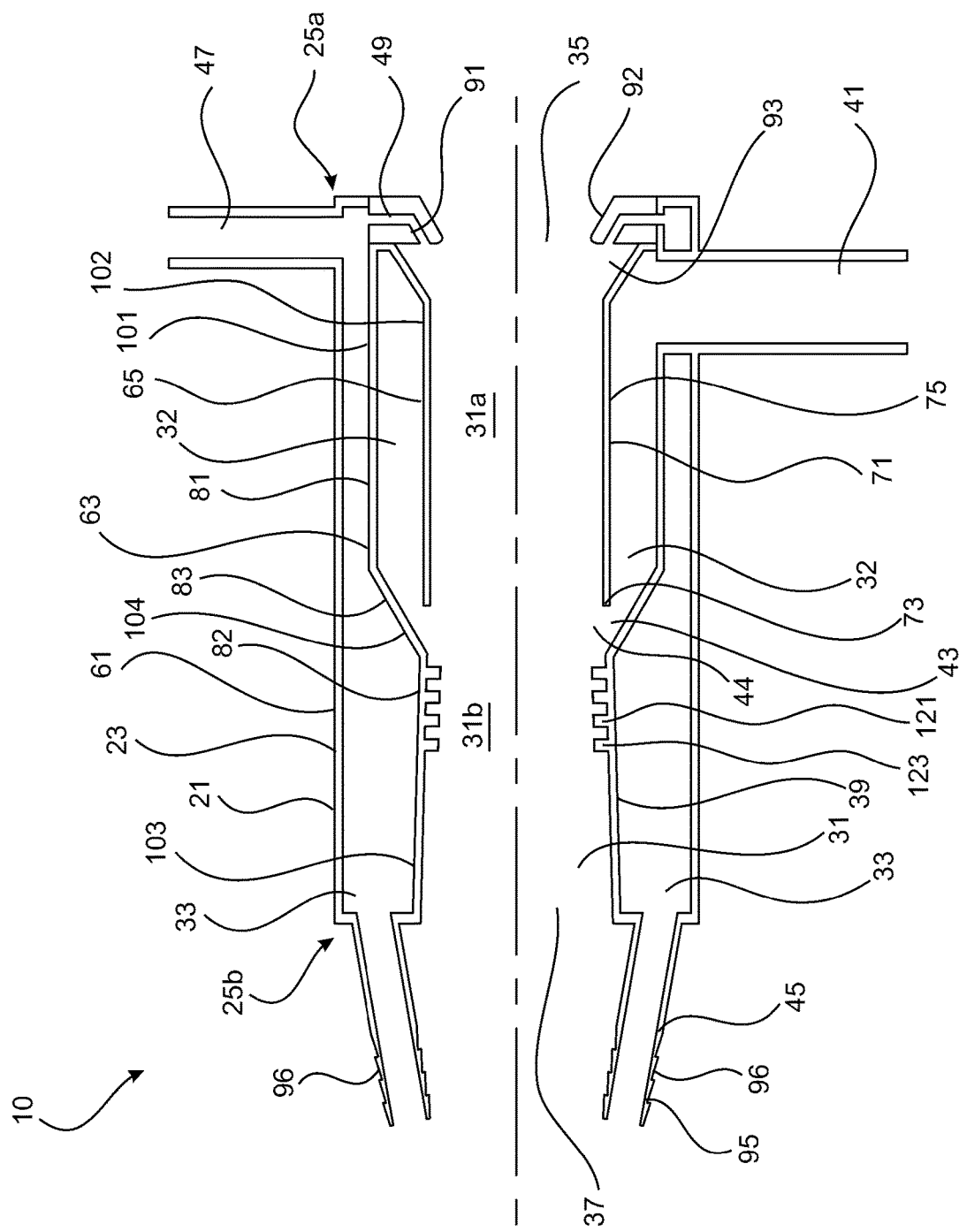
FIG. 10 is a longitudinal sectional view of a fifth embodiment of the extraction apparatus.

Referring now to FIG. 10, there is shown a fifth exemplary embodiment of extraction apparatus 10. The fifth exemplary embodiment of extraction apparatus 10 is similar in many respects to the first exemplary embodiment described above and so similar reference numerals are used to identify similar parts. In this fifth exemplary embodiment, the exhaust apparatus 10 incorporates flow disruption means 121 for causing disruption in flow along the first flow path.

The disruption may, for example, comprise turbulence generated in the flow. The disruption may assist in promoting mixing of exhaust gas with the air flow to assist in dilution of the exhaust gas. Further, the disruption may assist in promoting thermal effects of the air flow; that is, promoting the cooling influence of the air flow. Still further, the disruption may assist in promoting dissolution of exhaust gas in water delivered into the air flow. Furthermore, the disruption may assist generally in achieving effective mixing between the air, exhaust gas and injected water, with the aim of avoiding development of hot spots in the extraction hose 20.

In the arrangement shown, the disruption is provided at the boundary of the flow; specifically, along the downstream section 31*b* of the first flow path 31. With this arrangement, the flow disruption means 121 comprises protrusions such as ridges 123 provided on the second end section 82 of the first interior wall 63.

In the various embodiments described and illustrated previously, the second flow path 32 is disposed circumferentially about the first flow path 31 and has delivery outlet 43 opening onto the first flow path 31 to establishes delivery zone 44 at which the second flow path 32 communicates with the first flow path 31 to deliver exhaust gas into the first flow path 31 for mixing with an air flow along the first flow path 31. The delivery port 43 is configured at an annular port disposed circumferentially about the boundary of the first flow path 31, whereby the delivery zone 44 comprises an annular zone extending around the air flow along the first flow path 31.

Other arrangements are, of course, possible to provide for the second flow path 32 to communicate with the first flow path 31 to deliver exhaust gas into the first flow path 31 for mixing with an air flow along the first flow path 31. By way of example, one such other arrangement is featured in the next embodiment.

Figure 11:
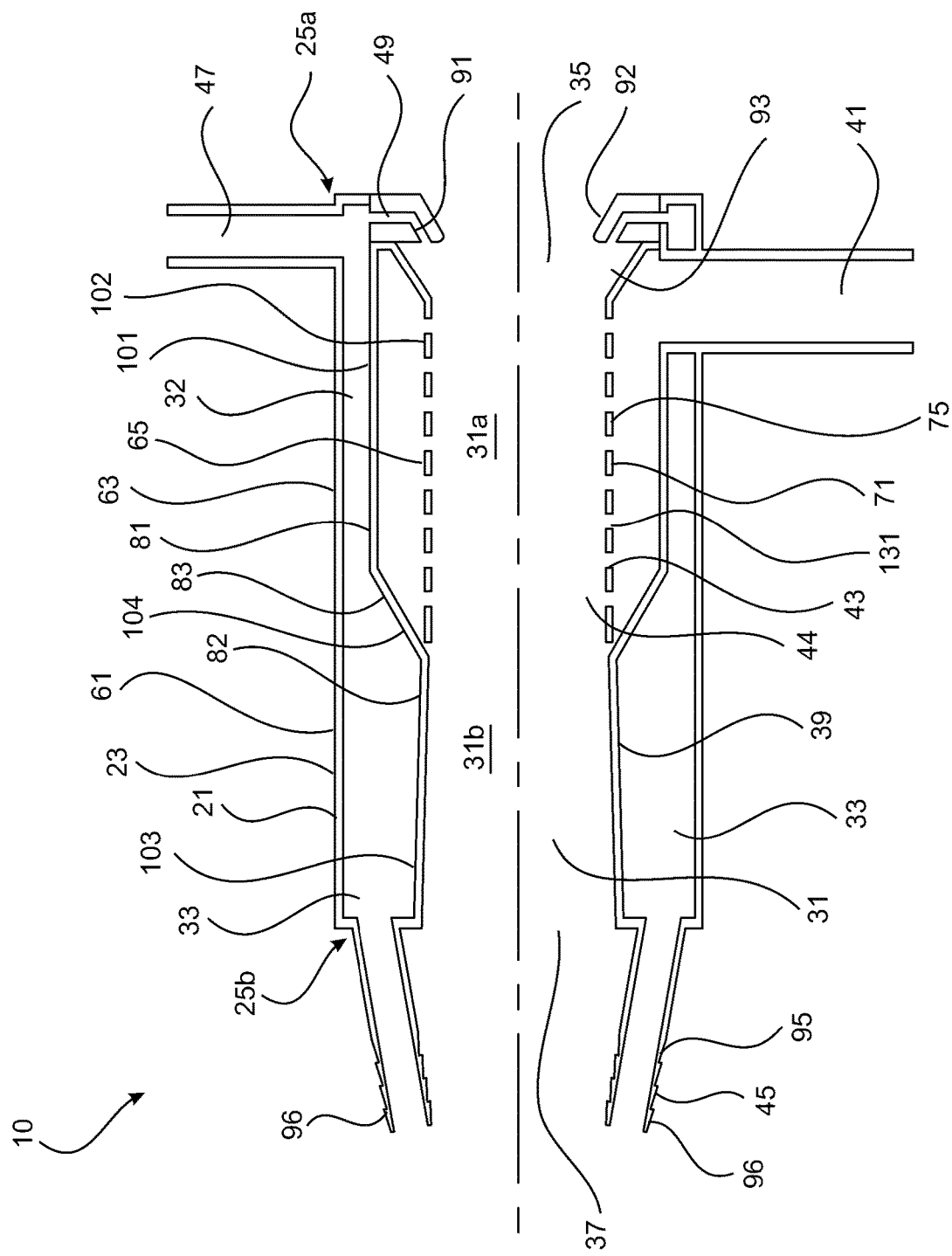
FIG. 11 is a longitudinal sectional view of a sixth embodiment of the extraction apparatus.

Referring now to FIG. 11, there is shown a sixth exemplary embodiment of extraction apparatus 10. The sixth exemplary embodiment of extraction apparatus 10 is similar in many respects to the first exemplary embodiment described above and so similar reference numerals are used to identify similar parts. In this sixth exemplary embodiment, the second flow path 32 opens onto the first flow path 31 adjacent side wall portion 39 through delivery outlet 43 comprising one or more delivery ports 131 provided in the second interior wall 65. In the arrangement shown, the delivery outlet 43 comprises a plurality of the delivery ports 131, with the delivery ports 131 being disposed at spaced intervals in an array extending circumferentially around and along the second interior wall 65. With this arrangement, the exhaust gas is still introduced into the first flow path 31 at the periphery (side boundary) of the air flow along the first flow path 31, but at locations around and along the second interior wall 65 rather than at an annular delivery port disposed adjacent the end of the second interior wall 65. In other words, the delivery zone 44 extends around and along the second interior wall 65.

In this sixth embodiment, the second interior wall 65 may extend to, and possibly engage with, the first interior wall 63. Indeed, the second interior wall 65 may be integral with the first interior wall 63.

In a variation to the sixth embodiment of extraction apparatus 10, the outlet 43 of the second flow path 32 may comprises a combination of a plurality of the delivery ports provided in the second interior wall 65 and an annular delivery port disposed adjacent the end of the second interior wall 65. This variation could, of course, be applied to any of the embodiments previously described featuring annular delivery port 43, with a modification involving incorporation of one or more additional delivery ports in the second interior wall 65.

In the foregoing description of various embodiments, the extraction apparatus 10 is described as being intended for connection to a flow generator in the form of a suction source by way of a discharge line (extraction hose 20) connected to the outlet 37. With this arrangement, the extraction hose 20 comprises a suction hose. In a variation, the flow generator may be in some other appropriate form; for example, the flow generator may comprise a blower communicating with the inlet 35 to deliver ambient air under pressure to the first flow path 31 through inlet 35, thereby generating an air flow along the first flow path 31. Such an arrangement would still likely require a discharge line (such as extraction hose 20) connected to the outlet 37 to carry away the fluid mixture comprising the diluted exhaust gas, but would not necessarily require a suction source. Typically, the flow generator (blower) would be operable to generate an air flow within the extraction apparatus 10 for conveying the fluid mixture along the extraction hose 20.

Modifications and variations such as would be apparent to the skilled addressee are considered to fall within the scope of the present invention.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

Furthermore, it should be understood that any feature described in relation to one embodiment may, as and when appropriate, be incorporated in any other embodiment even though the feature may not have necessarily been described and illustrated in relation to that other embodiment.

Reference to positional and relational descriptions, such as "first", "second", "third", "outer", "inner", "upper", "lower", "top" and "bottom" are used solely to distinguish one from another entity or action without necessarily requiring or implying any actual such relationship or order between such entities or actions. The terms are to be taken in context of the embodiments depicted in the drawings, and are not to be taken as limiting the invention to the literal interpretation of the term but rather as would be understood by the skilled addressee.

Additionally, where the terms "system", "device", and "apparatus" are used in the context of the invention, they are to be understood as including reference to any group of functionally related or interacting, interrelated, interdependent or associated components or elements that may be located in proximity to, separate from, integrated with, or discrete from, each other.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. An extraction apparatus comprising a body defining a first flow path extending between an inlet and an outlet for air flow from the inlet to the outlet, a second flow path for receiving an exhaust gas flow, the second flow path having a delivery outlet communicating with the first flow path to deliver exhaust gas into the first flow path for mixing with the air flow at a delivery zone, a third flow path for delivery of water for mixing with the air flow whereby there is confluence of air, exhaust gas and water to provide a fluid mixture for discharging through the outlet, the third flow path being in heat exchange relation with the first flow path whereby water flow in the third flow path provides a cooling effect on the fluid mixture, the third flow path further being in heat exchange relation with the second flow path whereby water flow in the third flow path provides a cooling effect on exhaust gas flow along the second flow path, the first flow path being in heat exchange relation with the second flow path whereby flow along the first flow path provides a cooling effect on exhaust gas flow along the second flow path, wherein the body comprises an exterior wall defining a boundary of the third flow path, a first interior wall disposed inwardly of the exterior wall, at least a portion of the third flow path being defined between the exterior wall and the first interior wall, and a second interior wall, at least a portion of the second flow path being defined between at least a portion of the first interior wall and the second interior wall whereby the second interior wall provides a dividing wall between the first flow path and the second flow path, and wherein the delivery outlet of the second flow path communicates with the first flow path adjacent the dividing wall.

2. The extraction apparatus according to claim 1 wherein the body comprises first, second and third cooling surfaces, the first cooling surface being defined by the first interior wall for exposure to hot exhaust gas flowing along the second flow path, the first cooling surface being cooled by the cooling effect of water flow through the third flow path, hot exhaust gas flowing along the second flow path being exposed to the first cooling surface whereby the first cooling surface can absorb heat from the hot exhaust gas, the second cooling surface being defined by the second interior wall for exposure to hot exhaust gas flowing along the second flow path, the second cooling surface being cooled by the cooling effect of a flow along the first flow path, hot exhaust gas flowing along the second flow path being exposed to the second cooling surface whereby the second cooling surface can absorb heat from the hot exhaust gas, and the third cooling surface being defined by the first interior wall for exposure to the fluid mixture of exhaust gas, air and injected water flowing along the first flow path, the third cooling surface being cooled by the cooling effect of water flow through the third flow path whereby the third cooling surface can absorb heat from the fluid mixture prior to the fluid mixture exiting through the outlet.

3. The extraction apparatus according to claim 1 further comprising provision for said delivery of water by injection into the first flow path to provide a mixture of air and water.

4. The extraction apparatus according to claim 3 wherein for said delivery of water into the first flow path has a directional component in the direction of flow within the first flow path from the inlet to the outlet.

5. The extraction apparatus according to claim 1 wherein the third flow path comprises a further water delivery outlet for delivery of water into the exhaust gas flow.

6. The extraction apparatus according to according to claim 1 wherein the second flow path opens onto the first flow path at a delivery outlet adjacent a side wall portion bounding the first flow path.

7. The extraction apparatus according to claim 6 further comprising a fourth cooling surface, the fourth cooling surface being disposed adjacent the delivery outlet for exposure to exhaust gas flowing to and through the delivery outlet.

8. The extraction apparatus according to claim 7 wherein the fourth cooling surface is defined by the first interior wall.

9. The extraction apparatus according to claim 1 wherein the first interior wall comprises a first end section disposed adjacent the inlet, a second end section disposed adjacent the outlet, and an intermediate section between the first and second end sections, wherein the first end section defines the first cooling surface and the second end section defines the third cooling surface.

10. The extraction apparatus according to claim 9 wherein the intermediate section defines the fourth cooling surface.

11. The extraction apparatus according to claim 1 wherein the first flow path is bounded by the first and second interior walls which cooperate to define the side wall portion.

12. The extraction apparatus according to claim 6 wherein the delivery outlet is configured as an annular delivery port extending circumferentially around the first flow path.

13. The extraction apparatus according to claim 1 wherein the respective section of the first flow path defined by the first interior wall is downstream of the respective section of the first flow path defined by the second interior wall with respect to the direction of flow along the first flow path and wherein the minimum cross-sectional flow area of that section of the first flow path defined by the first interior wall is equal to or greater than the minimum cross-sectional flow area of that section of the first flow path defined by the second interior wall.

14. The extraction apparatus according to claim 1 wherein the water flow along the third flow path provides water for cooling purposes.

15. The extraction apparatus according to claim 14 wherein the third flow path comprises an inlet and a discharge outlet for water flow between the inlet and discharge outlet, whereby surplus water can be discharged through the discharge outlet.

16. The extraction apparatus according to claim 15 wherein the inlet and the discharge outlet for the third flow path are disposed at or adjacent opposed ends of the body whereby the third flow path extends at least along the length of the body between the opposed ends.

17. The extraction apparatus according to claim 16 wherein the body defines an external wall disposed between the opposed ends, the external wall comprising the exterior wall defining a boundary of the third path.

18. A method of extracting an exhaust gas from a working environment at which the gas is generated, the method comprising: capturing the exhaust gas as an exhaust gas flow, directing the captured exhaust gas flow for delivery into an air flow to dilute the exhaust gas, the air flow being along a flow path bounded by a side wall portion and the exhaust gas being delivered into the air flow adjacent the side wall portion whereby exhaust gas is into introduced into the air flow at the periphery thereof, and injecting water into the air flow, whereby there is confluence of air, exhaust gas and water discharging through an outlet as a fluid mixture, wherein the exhaust gas is cooled prior to delivery into the air flow through heat exchange with a first cooling surface and a second cooling surface, wherein the first cooling surface is disposed between the exhaust gas flow and a cooling water flow, and the second cooling surface is disposed between the exhaust gas flow and the air flow, wherein the first and second cooling surfaces cooperate to define an annular space therebetween through which the exhaust gas flows, and wherein water injected into the air flow comprises water from the cooling water flow.

19. The method according to claim 18 wherein the exhaust gas is delivered into the air flow angularly in a direction towards the outlet for the air flow.

20. A method of treating an exhaust gas comprising capturing the exhaust gas as an exhaust gas flow, directing the captured exhaust gas flow for delivery into an air flow to dilute the exhaust gas, the air flow being along a flow path bounded by a side wall portion and the exhaust gas being delivered into the air flow adjacent the side wall portion whereby exhaust gas is introduced into the air flow at the periphery thereof, and injecting water into the air flow, whereby there is confluence of air, exhaust gas and water discharging through an outlet as a fluid mixture, wherein the exhaust gas is cooled prior to delivery into the air flow through heat exchange with a first cooling surface and a second cooling surface, wherein the first cooling surface is disposed between the exhaust gas flow and a cooling water flow, and the second cooling surface is disposed between the exhaust gas flow and the air flow, wherein the first and second cooling surfaces cooperate to define an annular space therebetween through which the exhaust gas flows, and wherein water injected into the air flow comprises water from the cooling water flow.

* * * * *